United States Patent [19]

Tezuka et al.

[11] Patent Number: 4,825,302

[45] Date of Patent: Apr. 25, 1989

[54] VIDEO RECORDING CAMERA

[75] Inventors: Nobuo Tezuka; Nobuaki Date; Syuichiro Saito, all of Kanagawa; Suzumu Kozuki, Tokyo, all of Japan

[73] Assignee: Canon Kabushiki Kaisha, Tokyo, Japan

[21] Appl. No.: 122,518

[22] Filed: Nov. 19, 1987

Related U.S. Application Data

[63] Continuation of Ser. No. 691,756, Jan. 15, 1985, abandoned.

[30] Foreign Application Priority Data

| Jan. 20, 1984 | [JP] | Japan | 59-8772 |
| Jan. 20, 1984 | [JP] | Japan | 59-8773 |
| Jan. 20, 1984 | [JP] | Japan | 59-8774 |
| Jan. 20, 1984 | [JP] | Japan | 59-8775 |
| Jan. 20, 1984 | [JP] | Japan | 59-8776 |

[51] Int. Cl.⁴ .......................................... H04N 5/781
[52] U.S. Cl. ................................... 358/335; 358/906; 358/342; 360/35.1
[58] Field of Search ............... 358/310, 335, 906, 909; 360/35.1, 33.1, 105, 107

[56] References Cited

U.S. PATENT DOCUMENTS

| 4,366,501 | 12/1982 | Tsunekawa et al. | 358/906 |
| 4,400,743 | 8/1983 | Takimoto et al. | 358/906 |
| 4,442,462 | 4/1984 | Kimura | 358/906 |
| 4,447,837 | 5/1984 | Hirata et al. | 358/906 |
| 4,504,866 | 3/1985 | Saito | 358/906 |
| 4,507,690 | 3/1985 | Azuma et al. | 358/906 |
| 4,530,014 | 7/1985 | d'Alayer de Costemore d'Arc | 360/33.1 |
| 4,531,164 | 7/1985 | Maeda et al. | 358/906 |
| 4,532,558 | 7/1985 | Oota et al. | 358/906 |
| 4,544,959 | 10/1985 | Kozuki et al. | 358/906 |

FOREIGN PATENT DOCUMENTS 2916387 10/1979 Fed. Rep. of Germany ...... 358/906

Primary Examiner—Donald McElheny, Jr.
Attorney, Agent, or Firm—Toren, McGeady & Associates

[57] ABSTRACT

A video recording camera having a movable head and actuating apparatus for controlling an exposing state of an image pick-up apparatus, wherein the internal structural arrangement of the camera is simplified for a head shifting apparatus and for a charging apparatus which accumulates an urging force for the actuating apparatus. This arrangement results in a reduction in size of the video recording camera. This arrangement enables a successive shot function in addition to a single shot function, and causes the head to shift to a position on a recording medium coinciding with a position indicated by an indicating member on the recording medium container while inhibiting power from being supplied to other operating systems of the camera until the coincidence is achieved.

27 Claims, 12 Drawing Sheets

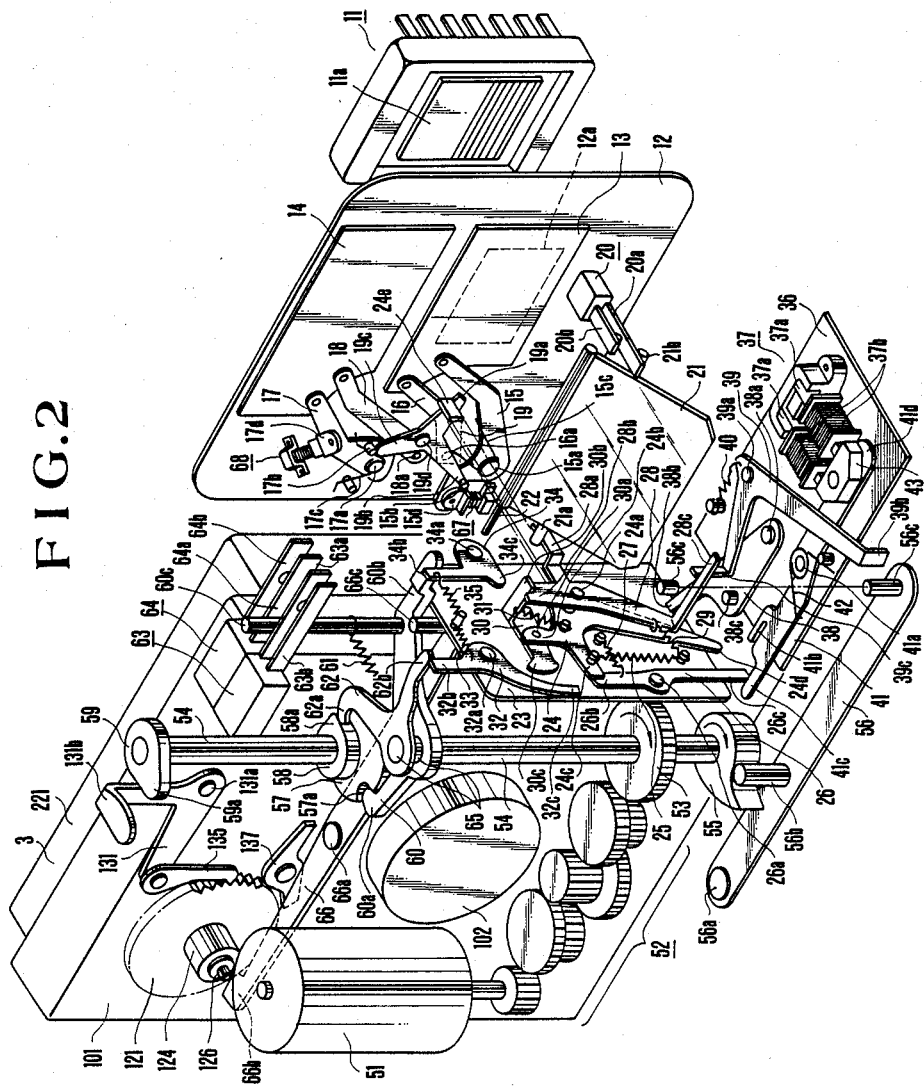

F I G.12
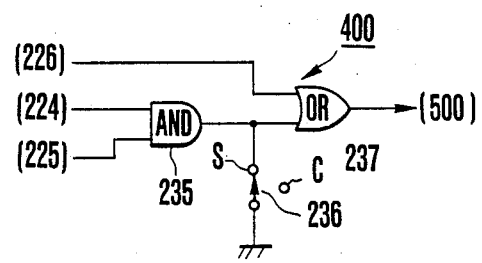

VIDEO RECORDING CAMERA

This is a continuation of application Ser. No. 691,756, filed Jan. 15, 1985 abandoned.

BACKGROUND OF THE INVENTION

1. Field of the Invention

This invention relates to a camera and more particularly to a video recording camera having image pick-up means and arranged to record a video signal on a record bearing medium through a recording head on the basis of an image pick-up signal obtained from the image pick-up means.

2. Description of the Prior Art

There have been proposed various video recording cameras of the above-stated kind. In this type of camera, if a predetermined amount of a video signal, such as one field or frame portion of a video signal, is arranged to be recorded in each recording track, while these tracks are formed in a concentric or annular manner on a magnetic disc or a drum or the like which is employed as a record bearing medium, that is, in a still video recording camera, the position of the recording head must be shifted relative to the record bearing medium unless the camera is provided with a multi-head arrangement.

Meanwhile, in order to ensure an adequate picture, a video recording camera must be provided with suitable control means for controlling the exposure of image pick-up means such as a shutter, a diaphragm, etc. Furthermore, where a view finder is arranged in the same manner as in a single-lens reflex camera, a movable mirror is necessary for selectively directing an image bearing light flux coming from a picture taking lens toward the image pick-up means and the view finder.

Furthermore, in light of the presently prevalent automatic focusing arrangement employed for cameras of the kind using silver halide film, there is also naturally a great demand for an automatic focusing arrangement for video recording cameras. Considering this, it is advantageous for a still video recording camera to have an automatic focusing device which includes such charging means as a spring, etc. and is arranged to perform a focusing operation by driving a picture taking lens with energy accumulated by the charging means. Such an arrangement not only serves to retain an important feature called "successive shootability" but is also advantageous in terms of reduction in cost.

Video recording cameras are thus required to have various operating means and devices as mentioned above. However, to provide each of these different operating devices separately with urging means and a drive source would result in a structural arrangement which is too large and complex for a camera which is reduced in size. Besides, such an arrangement also increases the probability of various malfunctions of the camera.

With respect to the functions of the video recording camera, there is a great demand for a successive shot function which permits repeated successive shooting as long as the camera trigger means is operated in addition to a normal single shot function which permits a shot to be made once every time the trigger means is operated. However, in view of the above-stated problem relative to the structural arrangement, the addition of the successive shot function has been difficult.

Meanwhile, the record bearing medium such as a magnetic disc or drum is housed within a container such as a cassette for easy handling. For the record bearing medium container, a record position indicating member, which is arranged to indicate a record position on the container, has been proposed for the purpose of preventing mishandling of the record bearing medium, such as double or duplicate recording, etc.

For the use of a record bearing medium which is housed in a container equipped with this indicating member, a video recording camera, of course, must be arranged to drive the indicating member in association with shifting the head mentioned in the foregoing. Furthermore, in that instance, the camera must be arranged to shift the position of the head on the record bearing medium until it comes to coincide with the record position indicated by the indicating member under a recording inhibited condition if the head position differs from the record position indicated. Then, such an arrangement further complicates the already complicated structural arrangement of the camera and thus further increases the probability of malfunctions.

Furthermore, in the event that the head position on the record bearing medium is thus continuously shifted until it comes to coincide with the position indicated by the indicating member of the container, it is obviously absurd to let power be continuously supplied to various means of the camera other than the head shifting means, such as the image pick-up means, recording means, exposure controlling means, record bearing medium driving means, etc., before the head position comes to coincide with the indicated record position. This is undesirable in terms of conserving power particularly for a hand-held camera or a portable type which has an internal power source of a limited capacity. Besides, with the power supply to the exposure control means kept on, if a camera is inadvertently triggered, an exposure would be wastefully carried out while no recording operation is performed. Such a wasteful exposure not only leads the operator to believe that an image has been recorded while no image has been recorded but also might result in failure of the image pick-up means to make an exposure during an actual picture taking operation since the shutter has already been released.

SUMMARY OF THE INVENTION

The present invention is directed to the solution of the various problems of the prior art mentioned in the foregoing. It is therefore a principal object of this invention to provide a novel video recording camera which individually or collectively solves these problems.

More specifically, it is a first object of the invention to provide a novel video recording camera of the kind having a movable head and actuating means for controlling the exposure of image pick-up means, wherein the internal structural arrangement of the camera is simplified for the recording head shifting means and for the charging means which accumulates the urging force for the actuating means; and the simplified structural arrangement effectively contributes to a reduction in the size of the video recording camera.

To attain the first object, a video recording camera embodying a first aspect of this invention comprises image pick-up means for producing an image pick-up signal corresponding to an image; actuating means for controlling the exposure of the image pick-up means with an urging force accumulated by charging means; recording means including a movable recording head and arranged to record a video signal on a record bearing medium on the basis of the image pick-up signal obtained from the image pick-up means; head shifting means for shifting the recording head relative to the record bearing medium; and an urging device including a drive source for urging the head shifting means and for charging the charging means.

In the video recording camera which embodies the first aspect of this invention, the structural arrangement of the urging system for urging the recording head shifting means and the charging means which accumulates the urging force of the actuating means is simplified to keep the arrangement of the internal mechanism from becoming large and complex, so that the camera can be compact.

It is a second object of this invention to provide a novel video recording camera of the kind having a movable recording head and actuating means for controlling the exposure of image pick-up means, wherein the structural arrangement of an urging system for urging the recording head shifting means and charging means which accumulates an urging force of the actuating means is simplified to save the arrangement of the internal mechanism from becoming large and complex and thus to permit a reduction in the size of the camera; and successive shot functions can be arranged in addition to a normal single shot function by a simple arrangement.

To accomplish the second object, a video recording camera embodying a second aspect of this invention comprises image pick-up means for producing an image pick-up signal corresponding to an image; actuating means for controlling the exposure of the image pick-up means with an urging force accumulated by charging means; recording means including a movable recording head and arranged to record a video signal on a record bearing medium on the basis of the image pick-up signal obtained from the image pick-up means; head shifting means for shifting the recording head relative to the record bearing medium; an urging device including a drive source and for urging the head shifting means and for charging the charging means; trigger means; and control means having a first control mode in which the control means causes, every time the trigger means is operated, the actuating means to operate and the recording means to record the video signal. After the recording operation, the urging device urges the head shifting means and charges the charging means and a second control mode in which the control means causes these operations to be repeatedly performed as long as the trigger means is operated, the control means being thus arranged to control the operations of the camera according to either of these modes.

In the video recording camera embodying the second aspect of this invention, the urging system for the recording head shifting means and for the charging means accumulating the urging force of the actuating means is simply arranged to permit simplification of the internal structural arrangement for reduction in the size of the camera. In addition, the camera is able to perform a successive shot function by a simple arrangement as well as a normal single shot function.

It is a third object of this invention to provide a novel video recording camera of the kind having a movable recording head and actuating means for controlling the exposure of image pick-up means and being arranged to use a record bearing medium housed in a container which is provided with a movable indicating member for indicating a recording position on the record bearing medium, in which an urging system for a recording head shifting means and for charging means which accumulates the urging force for the actuating means is arranged to permit simplification of the internal mechanism of the camera for a reduction in the size thereof; and, if the position of the recording head relative to the record bearing medium does not coincide with the recording position indicated by the indicating member on the record bearing medium container, the urging system is simply and accurately controlled to have the head shifted to the position indicated by the indicating member.

According to a preferred embodiment embodying the third object of this invention, a video recording camera of the kind using a record bearing medium housed within a container which is provided with an indicating member for indicating a recording position on the record bearing medium comprises image pick-up means for producing an image pick-up signal corresponding to an image; actuating means for controlling the exposure of the image pick-up means and arranged to operate with an urging force accumulated by charging means; recording means for recording a video signal on the record bearing medium on the basis of the image pick-up signal obtained from the image pick-up means including a recording head which is movable relative to the record bearing medium; head shifting means for shifting the recording head relative to the record bearing medium; an urging device including a drive source and urges the head shifting means and charges the charging means; lock means for locking the urging device upon completion of an urging operation on the head shifting means and a charging process on the charging means; and lock inhibiting means for inhibiting the lock means from locking the urging device until the position of the recording head on the record bearing medium comes to coincide with the recording position indicated by the indicating member.

Thus, in a video recording camera using a record bearing medium housed within a container which is provided with an indicating member for indicating a recording position on the record bearing medium, the urging system for the record head shifting means and for the charging means accumulating the urging force for the actuating means is simply arranged to permit simplification of the internal mechanism of the camera for reduction in size thereof; and, if the position of the recording head relative to the record bearing medium does not coincide with the recording position indicated by the indicating member on the record bearing medium container, the urging system is simply and accurately controlled so that the head is shifted to the position indicated by the indicating member.

It is a fourth object of this invention to provide a novel video recording camera of the kind having a movable recording head and actuating means for controlling the exposure of image pick-up means and being arranged to use a record bearing medium housed in a container which is provided with a movable indicating member for indicating a recording position on the record bearing medium, in which an urging system for the recording head shifting means and for the charging means which accumulates the urging force for the actuating means is simply arranged to permit simplification of the internal mechanism of the camera for reduction in size thereof; and if the position of the recording head relative to the record bearing medium does not coincide with the recording position indicated by the indicating member on the record bearing medium container, the camera is capable of preventing power from being wasted by unnecessary operation and failure of the video recording due to the unnecessary operation.

According to a preferred embodiment embodying the fourth object of this invention, a video recording camera of the kind using a record bearing medium housed in a container which is provided with an indicating member for indicating a recording position on the record bearing medium comprises image pick-up means for producing an image pick-up signal corresponding to an image; actuating means including electrical means and for controlling the exposure of the image pick-up means with an urging force accumulated by charging means; recording means for recording a video signal on the record bearing medium on the basis of the image pick-up signal obtained from the image pick-up means and including a recording head which is movable relative to the record bearing medium; head shifting means for shifting the recording head relative to the record bearing medium; an urging device including a drive source and for urging the head shifting means and for charging the charging means; drive means for driving the record bearing medium; power supply circuit means; and power supply inhibiting means for inhibiting power from the power supply circuit means to at least one of the image pick-up means, actuating means, recording means and record bearing medium drive means until the position of the recording head on the record bearing medium coincides with the recording position indicated by the indicating member of the record bearing medium container.

Thus, in the video recording camera using a recording bearing medium container which is provided with an indicating member for indicating a recording position on the record bearing medium, the urging system for the record head shifting means and the charging means which accumulates the urging force for the actuating means is arranged in a simple manner to permit simplification of the internal mechanism of the camera for reduction in size thereof; and, if the position of the recording head relative to the record bearing medium does not coincide with the recording position indicated by the indicating member on the record bearing medium container, the camera prevents power from being wasted by unnecessary operation and prevents failure of the video recording by such an unnecessary operation.

The third and fourth aspects of this invention mentioned above relate to control over the operation of the camera to be performed before the recording head is correctly positioned at an unrecorded or blank portion of the record bearing medium. Therefore, the further aspects of this invention and expansion thereof related to the third and fourth aspects do not have to have a record bearing medium container provided with the above-stated movable indicating member. For example, as disclosed in U.S. Patent Application Serial No. 030,930, filed Apr. 17, 1979 by the assignee of the present invention, now abandoned, an arrangement to position the recording head at an unrecorded or blank portion by determining whether or not a part of the record bearing medium confronting the recording head is already recorded every time the head is shifted may be employed for this invention. Therefore, the further aspects of this invention and their expansions related to the third and fourth aspects may be embodied in combination with the above-stated prior art arrangement.

It is a fifth object of this invention to provide a novel video recording camera which has a movable recording head, wherein the arrangement of an urging system for recording head shifting means and for an automatic focusing device is simplified to permit simplification of the internal mechanism of the camera for reducing camera size.

To attain the fifth object, a video recording camera embodying a fifth aspect of this invention in a preferred embodiment thereof comprises a focus adjustable picture taking lens; an automatic focusing device which includes charging means and is arranged to focus the picture taking lens on an object by driving the lens with a force accumulated by the charging means; image pick-up means for producing an image pick-up signal corresponding to an image of the object formed by the picture taking lens; recording means for recording a video signal on the record bearing medium on the basis of the image pick-up signal obtained from the image pick-up means and including a recording head which is movable relative to the record bearing medium; head shifting means for shifting the recording head relative to the record bearing medium; and an urging device including a drive source for urging the head shifting means and for charging the charging means.

Thus, in the video recording camera embodying the fifth aspect of this invention, the arrangement of an urging system for the recording head shifting means and for the automatic focusing device is simplified to permit simplification of the internal mechanism of the camera for reducing the size thereof; and, in addition to that, the simplified arrangement lessens the possibility of malfunctions of the various devices employed in the camera.

Other objects, features and aspects of this invention will become apparent from the following description of embodiments with reference to the accompanying drawings.

BRIEF DESCRIPTION OF THE DRAWINGS

Some of the preferred embodiments of this invention are arranged as shown in the accompanying drawings, in which:

FIG. 2 is an oblique view showing an embodiment of the invention and particularly the mechanical arrangement of the essential parts of an exposure system thereof;

FIG. 12 is a circuit diagram showing, by way of example, a circuit to be added to the circuit system shown in FIG. 11 in an arrangement to permit switch-over between a single-shot mode and a successive-shot mode.

DETAILED DESCRIPTION OF THE PREFERRED EMBODIMENTS

Figure 1:
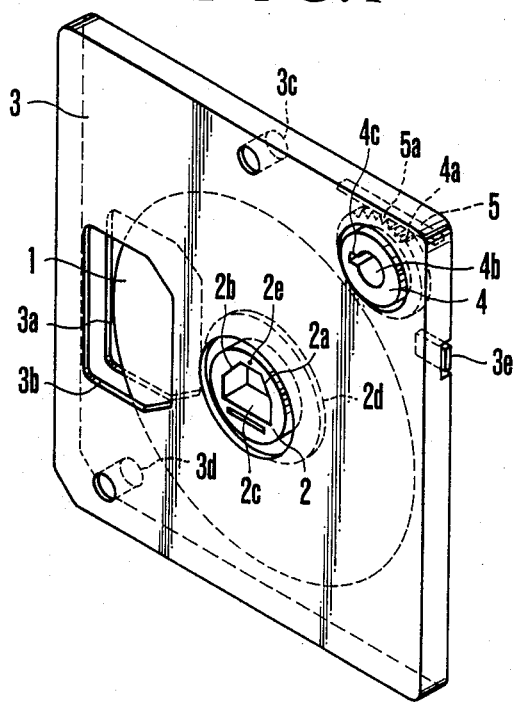
FIG. 1 is an oblique view showing, by way of example, a record bearing medium which is usable by embodiments of the invention, the illustration also showing a container which houses the record bearing medium therein.

FIG. 1 shows an example of a record bearing medium which can be used by the embodiments of the invention. A flexible magnetic disc 1 is employed as the record bearing medium. A center core 2 is secured to the central part of the disc 1 and is arranged to be coupled with a driving spindle which will be described later herein. The center core 2 is provided with a pentagonal opening which is formed at the center of the core 2 with five side faces. The center core 2 is arranged to come into pressed contact with the driving spindle at three side faces 2a, 2b and 2c of the five side faces of the pentagonal opening. A magnetizable piece is secured to a reverse side 2d of the center core 2 and is arranged to be attracted by a magnet disposed on a flange part of the driving spindle. A magnetizable pin 2e is arranged to produce a rotation phase signal which gives one pulse per revolution of the disc 1.

A cassette 3 rotatably houses the magnetic disc 1 and has openings 3a and 3b. The cassette 3 is also provided with positioning holes 3c and 3d for determining the cassette 3 loading position within a loading chamber provided on the side of a camera. A recording inhibit claw 3e is provided on the cassette 3. The camera is arranged to be allowed to record signals on the magnetic disc 1 only when the claw 3e remains on the cassette 3 and no longer records signals when the claw 3e is removed. A counter 4 on the cassette 3 to have ratchet teeth 4a, formed on the periphery thereof. A locking member 5, which is made of an elastic material, has a lock part 5a thereof engaging the ratchet teeth 4a. As will be described later, the counter 4 is turned to an angle of a predetermined degree corresponding to one tooth of the ratchet, when a recording head is shifted from one recording position to another after a signal has been recorded in the recording position on the magnetic disc 1. A key slot 4c, which is provided at a counter driving hole 4b, is arranged to indicate a next recording position expected on the magnetic disc 1 during the rotation phase thereof. Then, the number of recording tracks already recorded or the tracks which remain to be recorded are observable on a scale provided on the housing of the cassette 3.

In the specific embodiments given herein, the magnetic disc 1 is arranged to have the recording tracks formed in a concentric manner.

Next, referring to FIG. 2, an embodiment of this invention and particularly the essential parts of an exposure system thereof are arranged as follows. A CCD solid-state image sensor 11 is employed, by way of example, as image pick-up means. A shutter base plate 12 is provided with an exposing aperture part 12a. The image sensor 11 is arranged behind the aperture part 12a to have a light receiving part 11a opposed thereto. Leading and trailing shutter blades 13 and 14 are arranged to vertically travel relative to the aperture part 12a on the front side of the shutter base plate 12. These shutter blades 13 and 14 are mounted on the fore ends of arms 15, 16, 17 and 18 which are turnable over the base plate 12 respectively by shafts 15a and 16a and shafts 17a and 18a and form a parallel link mechanism jointly with these shutter blades 13 and 14. Furthermore, blade moving springs 15c and 17c are respectively attached to the arms 15 and 17. These arms 15 and 17 have attraction or attractable pieces 15d and 17d attached to them. Blades holding electromagnets 67 and 68 are secured to the shutter base plate 12 and is arranged to keep the blades 13 and 14 in their conditions as shown in the drawings, that is, the blades 13 and 14 keep the springs 15c and 17c in a charged state by attracting the attraction pieces 15d and 17d. Each of the electromagnets 67 and 68 is prepared with coil wound around a permanent magnet and is arranged to release the attraction piece 15d or 17d from the attraction of the permanent magnet when the coil is energized.

A shutter charge lever 19 is turnably mounted on the shutter base plate 12 by a shaft 19d. An arm part 19a of the lever 19 engages an arm part 24e of a main drive lever 24 which will be described later. Other arm parts 19b and 19c of the lever 19 engage pins 15b and 17b provided on the arms 15 and 17 when the lever 19 turns clockwise. The shutter blade moving springs 15c and 17c are charged when the arms 15 and 17 are turned counterclockwise by the lever 19. A movable mirror 21 is provided for a view finder. Under a non-image picking up condition, or in observing an object to be recorded, the mirror 21 reflects a light flux coming from a picture taking lens toward the view finder in a known manner in film cameras. The mirror 21 is turnable on a shaft 22. A mirror drive pin 21a is arranged on one side of the mirror 21.

A base plate 23 is arranged to carry levers, etc., provided for driving the mirror. A main drive lever 24 is pivotally carried by a shaft 24a, which is disposed on the base plate 23, and is urged by a spring 25 to turn counterclockwise on the shaft 24a. Furthermore, a mirror drive lever 28, which is urged by a spring 29 to turn clockwise, is also pivotally carried by the shaft 24a. An arm part 28a of the mirror drive lever 28 engages the mirror drive pin 21a and is arranged to turn the mirror 21 clockwise on the shaft 22 by its counterclockwise movement. An interlock lever 30 is pivotally carried by a shaft 30a provided on an arm part 24b of the main drive lever 24 and is urged to turn clockwise by a spring 31. A bent part 30b of the interlock lever 30 engages a stepped part 28b of the mirror drive lever 28 along the charge is completed, as shown in FIG. 2. A clamp lever 26 is pivotally carried by a shaft 26a provided on the base plate 23 and is urged by a spring 27 to turn clockwise. Under the condition shown in FIG. 2, a stepped part 26b which is formed at the fore end of the clamp lever 26 engages an arm part 24c of the above-stated main drive lever 24. A mirror uplift release lever 32 is pivotally carried by a shaft 23a provided on the base plate 23 and is urged to turn clockwise by a spring 33. One end 32b of the release lever 32 engages an end part 62b of a mirror descent control lever 62. Another end 32c of the release lever 32 is arranged to engage one end 30c of the interlock lever 30 when the mirror 21 is uplifted. On the base plate 23 is further arranged a charge shaft unlocking lever 34, which is pivotally carried by a shaft 34a and is urged to turn counterclockwise by a spring 35. One end 34b of the lever 34 abuts one end 60b of a charge shaft lock lever 60 which will be described later. When the mirror 21 is uplifted, the mirror drive pin 21a pushes one end 34c of the unlocking lever 34 to cause the lever 34 to turn clockwise. When the mirror 21 is completely uplifted, a switch 20 generates a mirror uplift completion signal with one contact piece 20a thereof pushed into contact with another contact piece 20b by a pin 21b which is provided on one side of the mirror 21.

An electromagnetic 37 is arranged on another base plate 36 to initiate the mirror 21 uplifting, etc. The electromagnet 37 is composed of a permanent magnet 37a and a coil 37b. The attracting force of the permanent magnet 37a is arranged to be cancelled when the coil 37b is energized. A charge lever 38 is pivotally carried by a shaft 38a provided on the base plate 36 and is arranged to be pushed during a charging process on its fore end part 38b by a pin 56c of a main charge lever 56 to turn counterclockwise. The fore end part 38b of the charge lever 38 also engages an arm part 24d of the main drive lever 24. A start lever 41 is pivotally carried by a shaft 41a provided on the base plate 36 and is urged by a spring 42 to turn clockwise. An attraction or attractable piece 43 is mounted on one end 41d of the start lever 41 and is arranged to be attracted by the electromagnet 37. Under the condition shown in FIG. 2, the attraction piece 43 is stuck to the electromagnetic 37 by the attraction of the latter. The start lever 41 is provided with an arm part 41b which is arranged to engage a pin 38c provided on the charge lever 38 and another arm part 41c which is arranged to engage one end 26c of the clamp lever 26. A diaphragm operating lever 39 is pivotally carried by a shaft 39a provided on the base plate 36 and is urged by a spring 40 to turn counterclockwise. The diaphragm operating lever 39 is provided with a bent up part 39c which is formed at one end of the lever 39 and engages an arm part 28c of the mirror drive lever 28. The lever 39 is further provided with a bent down part 39b which is arranged to stop down in a known manner the aperture of a diaphragm disposed within the picture taking lens (not shown), so that a desired aperture value or size can be obtained.

A motor 51, which is used as the drive source, urges a recording head shifting device and also charges the above-stated various devices. The driving force of the motor 51 is transmitted to a gear 53 via a gear train 52. A charge shaft 54 is rotatably carried by a base plate (not shown). The gear 53 and cams 55, 57, 58 and 59 are connected to the charge shaft 54 in one unified body. A main charge lever 56 is pivotally carried by a shaft 56a and is urged by a spring (not shown) to turn counterclockwise. The lever 56 is provided with a cam follower pin 56b which constantly abuts the cam 55. The main charge lever 56 is further provided with a pin 56c which is provided on the fore end part of the lever 56 and is arranged to abut on the arm part 38b of the charge lever 38. When the main charge lever 56 is caused to turn clockwise by the clockwise turn of the cam 55, the charge lever 38 via the pin 56c also turns clockwise.

A charge shaft lock lever 60 is pivotally carried by a shaft 65 and is urged by a spring 61 to turn clockwise. The lock lever 60 is provided with a lock part 60a, which is disposed at the fore end of the lever 60 and is pushed against the periphery of the cam 57. A tail end 60b of the lock lever 60 abuts one end 34b of the unlocking lever 34. The lever 60 is further provided with a switch operating pin 60c which is arranged near the tail end 60b of the lever 60 to operate contact pieces 63a and 64a of switches 63 and 64 which will be described later. The cam 57 is secured to the charge shaft 54 and is provided with a recessed part 57a. Upon completion of a charging process on the exposure effecting mechanism or device as shown in FIG. 2, the fore end lock part 60a of the lever 60 falls into the recessed part 57a to lock the charge shaft 54. A mirror descent control lever 62 is also pivotally carried by the shaft 65 in the same manner as the charge shaft lock lever 60. One end 62a of the lever 62 is arranged to be pushed against a recessed part 58a of the cam 58 while another end 62b abuts the arm part 32b of the lever 32. The cam 59, which is attached to the charge shaft 54, is provided with a protrudent part 59a. During the rotation of the cam 59, this part 59a pushes an arm part 131b of a claw drive lever 131 which forms a head shifting device. This causes the lever 131 to turn counterclockwise on a shaft 131a as viewed on FIG. 2. A counter drive shaft interlocking lever 66 is arranged to be caused to turn counterclockwise on a shaft 66a by a thrusting out movement of a counter driving shaft 126, which takes place in the leftward direction as viewed in FIG. 2 (rightward as viewed in FIG. 4) to push a fore end protrudent part 66b of the lever 66 when the phase of the key slot 4c of the counter 4 of the cassette 3 shown in FIG. 1 does not coincide with the phase of a key 126b provided at a fore end boss part 126a of the counter driving shaft 126, which is disposed on the side of the camera (see FIG. 4). To the other end of the lever 66 is attached a pin 66c. When the lever 66 is caused to turn counterclockwise, the pin 66c forces the charge shaft lock lever 60 to turn counterclockwise by pushing one end 60b of the lever 60. As a result, even when the fore end lock part 60a of the lever 60 has fallen into the recessed part 57a of the cam 57, the lock part 60a is disengaged from the recessed part 57a. The switches 63 and 64 are arranged to be operated by the pin 60c of the lever 60 as mentioned above.

Figure 3A:
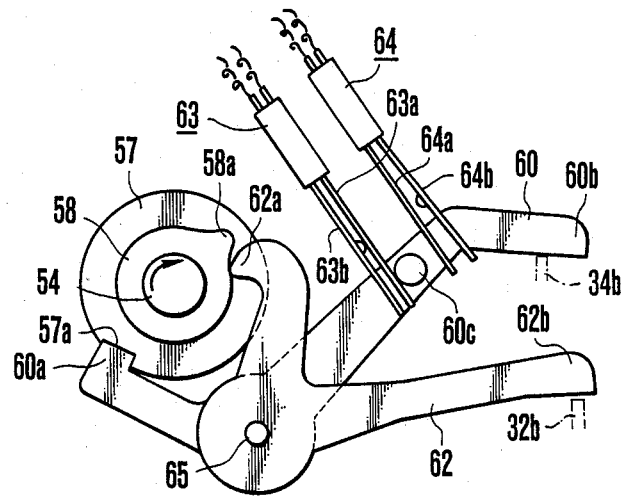
FIGS. 3A and 3B show the charge shaft of the mechanical arrangement of FIG. 2 together with other members associated therewith in a state of having completed charging and immediately after the start of the charging process.

Referring to FIG. 3A, with the fore end lock part 60a of the lever 60 in the recessed part 57a of the cam 57, the switch 63 turns on and the other switch 64 turns off. With the lock part 60a disengaged from the recessed part 57a, the switch 63 turns off and the switch 64 turns on.

Again referring to FIG. 2, reference numeral 101 identifies a disc-and-head drive unit and reference numeral 102 a disc rotating motor. They will be described later.

Figure 3B:
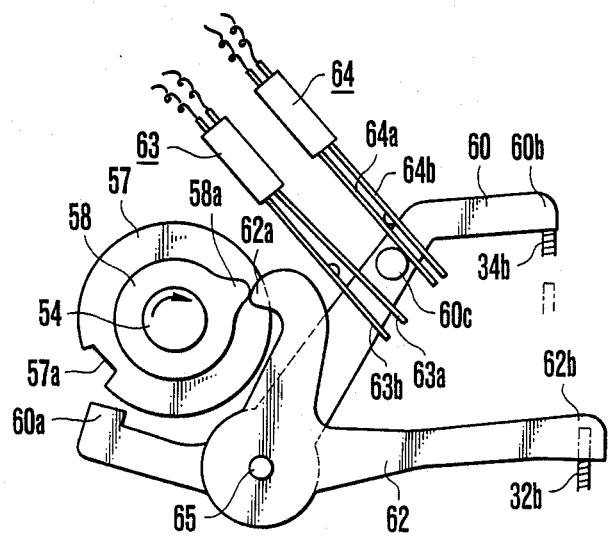

Referring to FIGS. 3A and 3B together with FIG. 2, the operation of the exposure effecting mechanism or device is described as follows. When the coil 37b of the electromagnet 37 is energized when the charge is completed as shown in FIG. 2, the attraction piece 43 is released from its attracted condition. The urging force of the spring 42 turns the start lever 41 clockwise. The arm part 41c of the lever 41 then turns the clamp lever 26 counterclockwise This turn of the clamp lever 26 disengages the stepped part 26b from the tail end 24c of the main drive lever 24. The urging force of the spring 25 then causes the main drive lever 24 to turn counterclockwise. The arm part 24b of the lever 24 then releases the arm part 19a of the shutter charge lever 19 from the pushed state. Furthermore, since the stepped part 28b of the mirror drive lever 28 and the bent part 30b of the interlock lever 30 are still engaged with each other at that time, the mirror drive lever 28 turns counterclockwise together with the main drive lever 24. This causes, via the pin 21a of the mirror 21, the mirror 21 to turn upward. Meanwhile, the arm part 28c of the mirror drive lever 28 causes the diaphragm operating lever 39 to turn clockwise. The bent down part 39b of the lever 39 then stops down the diaphragm of the picture taking lens (not shown) a predetermined value. The counterclockwise turn of the main drive lever 24 releases the arm part 19a of the shutter charge lever 19 from its state of being pushed by the arm part 24e of the lever 24. With the shutter charge lever 19 thus released, the arms 15 and 17 become turnable to permit the shutter blades 13 and 14 to travel. Upon arrival of the mirror 21 at its uplifted end position, the pin 21a of the mirror 21 causes the charge shaft lock lever 60 to turn counterclockwise via the charge shaft unlocking lever 34. The lock part 60a of the lock lever 60 then disengages the recessed part 57a of the cam 57. At that time, the switch 63 turns off and the switches 64 and 20 turn on.

Following this, when the coil of the electromagnet 67 is energized in synchonization with a process of reading out the output of the image sensor 11, the arm 15 is released to allow the leading shutter blade 13 to be caused to travel by the force of the spring 15c. Then, after the lapse of a predetermined length of time, the coil of the electromagnet 68 is energized to release the arm 17. With the arm 17 thus released, the force of the spring 17c causes the trailing shutter blade 14 to travel. With the shutter blades 13 and 14 allowed to travel in this manner, the image sensor 11 is exposed to light.

With the image sensor 11 having been exposed, one field or one frame position of a video signal is recorded on the magnetic disc 1 on the basis of the output of the image sensor 11. Upon completion of recording of the video signal, power to the motor 51 begins. The charge shaft 54 is rotated clockwise. Referring to FIG. 3B, with the charge shaft 54 rotated, the fore end part 62a of the mirror descent control lever 62 is first pushed by the protrudent part 58a of the cam 58. The lever 62 is thus caused to turn clockwise as viewed in FIG. 3B. The end part 62b of the lever 62 then causes the mirror uplift release lever 32 to turn counterclockwise as viewed in FIG. 2. The end part 32c of the lever 32 then pushes one end 30c of the interlock lever 30 to turn counterclockwise. The bent part 30b of the lever 30 is disengaged from the stepped part 28b of the mirror driving lever 28. The mirror driving lever 28 is thus allowed to be turned clockwise by the urging force of the spring 29. The clockwise turn of the lever 28 brings the mirror 21 back to the position shown in FIG. 2. Meanwhile, with the mirror drive lever 28 turning clockwise, the diaphragm operating lever 39 is also brought back to the position of FIG. 2 by the urging force of the spring 40.

The motor 51 further rotates. Then, before the end of approximately the first half turn of the charge shaft 54, the cam 59 urges the head shifting device as will be further described later. With the charge shaft 54 completing a remaining half turn, when one turn of the charge shaft 54 is just completed, the rotation of the motor 15 comes to a stop. During the latter half turn of the charge shaft 54, the main charge lever 56 is turned clockwise by the cam 55. The pin 56c of the lever 56 then causes the charge lever 38 to turn counterclockwise. The fore end part 38b of the lever 38 then pushes the arm part 24d of the main drive lever 24. Furthermore, the pin 38c of the lever 38 pushes one side part of the start lever 41. These levers 24 and 41 are thus brought back to the state shown in FIG. 2 respectively. In other words, the start lever 41 is turned counterclockwise and the attraction piece 43 of the start lever 41 is attracted by the electromagnet 37. The main drive lever 24 is turned clockwise, engaging the stepped part 26b of the clamp lever 26 with the arm part 24c to lock the lever 24 in the position shown in FIG. 2. Furthermore, at that instant, the bent part 30b of the interlock lever 30, which is attached to the arm part 24b of the main drive lever 24, engages the stepped part 28b of the mirror drive lever 28. Then, the spring 25 is charged. Furthermore, at the same time, the arm part 19a of the shutter charge lever 19 is pushed by the arm plate 24e of the main drive lever 24 and the lever 19 is thus turned clockwise. The pins 15b and 17b of the arms 15 and 17 are then pushed by the arm parts 19b and 19c of the lever 19. This causes the arms 15 and 17 to turn counterclockwise. As a result, the shutter blades 13 and 14, and arms 15, 16, 17 and 18 are reset in their positions, as shown in FIG. 2. Then, the springs 15c and 17c are charged. Under this reset condition, the arms 15 and 17 are attracted by the electromagnets 67 and 68 and are thus kept in the attracted states.

In this specific embodiment as is apparent from the above description, the shutter unit 12–19, the movable mirror 21 together with the mirror operating levers 24, 28, etc., and the diaphragm operating lever 39 for operating the diaphragm disposed within the picture taking lens (not shown) together with the levers 24, 28, etc., which are arranged to drive the lever 39 constitute operation means for controlling the exposure of the image sensor 11. In controlling the exposure, the springs 15c and 17c for moving the shutter blades 13 and 14 and the spring 25, which is attached to the main drive lever 24, constitute charging means. Furthermore, the elements 51–56 and 59 constitute the urging device for actuating the head shifting device which will be described later and also for charging the above-stated charging means. Meanwhile, the motor 51 represents a drive source.

Figure 4:
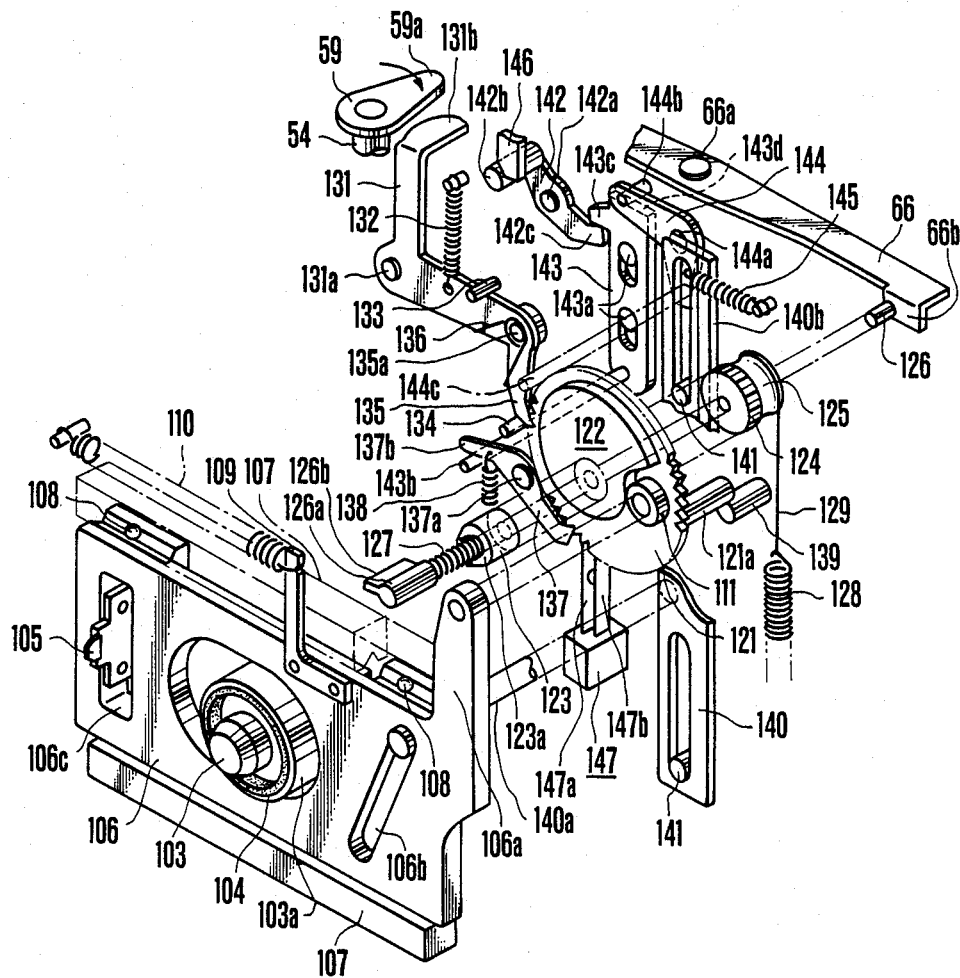
FIG. 4 is an oblique view showing the mechanical arrangement of an embodiment of the invention and particularly that of a disc and head drive unit of the embodiment.

Referring now to FIG. 4, the disc-and-head drive unit 101 which includes the head shifting device is arranged as follows. The illustration of FIG. 4 includes a magnetic recording head 105 which is arranged to confront the magnetic disc 1 mentioned in the foregoing. The magnetic head 105 is disposed within a hole part 106c of a carriage 106. The carriage 106 is arranged to shift the magnetic head 105 toward a disc rotating spindle 103. The spindle 103 is coupled with the rotating shaft of a disc rotating motor 102 shown in FIG. 2 and is provided with a flange part 103a which is formed at a part of the spindle 103 for positioning the center core 2 of the magnetic disc 1. A permanent magnet 104 is mounted on the flange part 103a and is arranged to attract the center core 2. Rails 107 are provided with V-shaped grooves for guiding the carriage 106 and are arranged to confront via balls 108 V-shaped grooves formed in the sides of the carriage 106. A return spring 110 is attached to the carriage 106 via an arm member 109 and is arranged to exert an urging force to cause a cam follower 117, which is disposed at an arm part 106a of the carriage 106, to be pressed against the cam surface of a cam 122 which will be described later.

A ratchet wheel 121 is provided with ratchet teeth formed on the periphery thereof. A cam 122, a cylindrical member 123, a pinion gear 124 and a pulley 125 are formed in one unified body with the ratchet wheel 121. The ratchet wheel 121 is rotatably disposed on the base plate of the disc-and-head drive unit 101 (FIG. 2). A counter drive shaft 126 is provided with a key 126b, which is formed on a boss part 126a. The key 126b is fitted into a slit 123a formed in the cylindrical member 123 and is also arranged to be fitted into the key slot 4c formed at the counter 4 of the cassette 3. The counter drive shaft 126 has its central shaft part pierce through the ratchet wheel 121 while the tail end of the shaft 126 extends to the reverse side of the pulley 125. The shaft 126 is movable in the axial direction thereof. A spring 127 urges the drive shaft 126 to move toward the open end of the cylindrical member 123, i.e., to the left as viewed in the drawing (in a protruding direction). Meanwhile, a retaining member is arranged to prevent the drive shaft 126 from being pulled out by the urging force of the spring 127. When the key 126b of the drive shaft 126 is not in phase with the key slot 4c of the counter 4 of the cassette 3, the shaft 126 is pushed to the right against the force of the spring 127. When the phase of the key 126b comes to coincide with that of the key slot 4c, the force of the spring 127 brings the key 126b into engagement with the key slot 4c. The counter drive shaft interlocking lever 66, which is shown in FIG. 2, is arranged to operate in response to the axial displacement of the counter drive shaft 126.

A spring 128 is arranged to exert, via a wire 129, a clockwise urging force on the pulley 125 and, accordingly, also on the ratchet wheel 121. At the time of resetting which will be described later, the clockwise movement of the ratchet wheel 121 is restricted with a pin 121a which is provided on the ratchet wheel 121 which abuts a stopper 139. A slide plate 140 is provided with a slot and is movable along the slot by a shaft 141. The slide plate 140 is further provided with a rack part 140b which is formed at a part of the plate 140 and is arranged to engage the pinion gear 124. The slide plate 140 also has a carriage vibration preventing pin 140a which is fitted into a slot 106a formed in the carriage 106. When the ratchet wheel 121 rotates counterclockwise, as will be described later, the slide plate 140 moves downward as viewed in FIG. 4.

A claw drive lever 131 is urged by a spring 132 to turn counterclockwise on a shaft 131a. The lever 131 is provided with a feed claw 135, which is pivotally carried by a shaft 135a arranged at one end of the lever 131. A spring 136 urges the feed claw 135 to move counterclockwise. A stopper 133 is arranged to restrict the movement of the claw drive lever 131. Another stopper 135 is arranged for the feed claw 135. A bent part 131b is formed at the other end of the claw drive lever 131. When the charge shaft 54, which is shown in FIG. 2, is rotated by the motor 51, the cam 59 pushes the bent part 131b to cause the lever 131 to turn clockwise on the shaft 131a. Then, the ratchet wheel 121 is caused, via the drive claw 135, to turn counterclockwise. A lock claw 137 is pivotally carried by a shaft 137a and is urged by a spring 138 to turn counterclockwise. The lock claw 137 locks the ratchet wheel 121 by engaging the ratchet teeth of the wheel 121.

In this embodiment, the cam 122 is arranged to give a cam lift corresponding to one track pitch on the magnetic disc 1 for a forward movement of the ratchet wheel 121 by one tooth thereof, which results from one turn of the charge shaft 54. Therefore, the head 105 is thus arranged to be shifted to an extent corresponding to one track pitch every time the cam 59 makes one turn.

A reset lever 142 is arranged to be swingable on a shaft 142a. A pin 142b is formed on one end of the reset lever 142 and is arranged to engage an operation member 146. The operation member 146 is arranged to come down to engage the pin 142b when, for example, the lid of a cassette loading chamber is opened or when the cassette 3 is taken out. Meanwhile, another end 142c of the reset lever 142 engages a protrudent part 143c of a lock claw release lever 143. The lock claw release lever 143 is movable in the vertical direction as viewed in FIG. 4 with shafts 143a guiding it along slots formed therein. A pin 143b which is provided on the lever 143 is arranged to engage one end 137b of the lock claw 137. A drive claw release lever 144 is swingable on a shaft 144a and is urged by a spring 145 to turn counterclockwise. Normally, a pin 144b which is provided on one end of the lever 144, pushes one end 143d of the lever 143. Another pin 144c, which is also provided on the drive claw release lever 144, is arranged to engage the drive claw 135.

An end detection switch 147 is arranged to turn off when the head 105 is shifted one track pitch beyond the last recording position in a predetermined recording area on the disc 1. At that instant, the pin 121a of the ratchet wheel 121 moves one contact piece 147a of the switch 147 away from the other contact piece 147b to turn the switch 147 off. The disc-and-head drive unit 101, which includes the head shifting device and is arranged as described above, operates in the following manner.

The cassette 3, which is shown in FIG. 1, is placed in the cassette loading chamber located closely above the head carriage 106. With the cassette 3 thus loaded, a cassette loading detection switch, which will be described later, turns on. Then, the center core 2 of the magnetic disc 1 is fitted on the disc driving spindle 103 at the center hole thereof until the reverse side of the center core 2 abuts the flange part 103a of the spindle 103. With the magnetic disc 1 thus mounted on the spindle 103, the magnetic piece attached to the reverse side of the center core 2 is attracted by the permanent magnet 104 which is mounted on the flange part 103a. Meanwhile, the recording head 105 enters the opening 3a of the cassette 3 to confront the disc 1. Furthermore, with the cassette 3 loaded, the operation member 146 releases the pin 142b of the reset lever 142 from a pressed state.

When the camera is in the state of being loaded with the cassette 3, the ratchet wheel 121 is in the reset position as shown in FIG. 4. Accordingly, the carriage 106, the head 105, and the slide plate 140 and the carriage vibration preventing pin 140a, which is attached to the slide plate 140, are all in their reset positions as shown in FIG. 4. In this condition, if the phase of the key 126b of the counter drive shaft 126 does not coincide with that of the key slot 4c of the counter 4 of the cassette 3, the key 126b of the drive shaft 126 is pushed by the lower surface of the counter 4. This causes the drive shaft 126 to be pushed to the right as viewed on FIG. 4 against the force of the spring 127. Then, the counter drive shaft interlocking lever 66 is caused by the rightward movement of the drive shaft 126 to turn counterclockwise. The pin 66c of the lever 66 then causes the charge shaft lock lever 60 to turn counterclockwise as viewed in FIG. 2. As a result, the cam 57 is released from a state of being locked by the lock part 60a of the lever 60. Accordingly, the charge shaft 54 is also unlocked. Furthermore, the turning movement of the lever 60 turns the switch 63 off and the switch 64 on.

When a power supply switch which will be described later is switched on under this condition, the motor 51 is energized and the charge shaft 54 turns clockwise as viewed in FIG. 2. Then, while the charge shaft 54 makes approximately the first half turn, the cam 59 which is attached to the fore end of the shaft 54 causes the claw drive lever 131 to turn clockwise by pushing the bent part 131b. The feed claw 135 which is mounted on the fore end of the lever 131 then causes the ratchet wheel 121 to turn counterclockwise an extent of one ratchet tooth. As a result, the head carriage 106 is moved by the cam 122 to the right as viewed in FIG. 4 an extent of the cam 122 lift corresponding to the turn of the ratchet wheel 121 by one tooth. The movement of the carriage 106 shifts the head 105 from a reset position to a position corresponding to a first recording track within a predetermined recording area of the magnetic disc 1. The ratchet wheel 121 is locked by a lock claw 137 in the condition of having been turned by the drive claw 135 one tooth.

Meanwhile, with the ratchet wheel 121 thus turned as mentioned above, the counter drive shaft 126 turns together with the wheel 126. Then, if the phase of the key 126b of the shaft 126 coincides with that of the key slot 4c at the position to which the head 105 is shifted, the boss part 126a and the key 126b of the shaft 126 plunge into the hole 4b and the key slot 4c of the counter 4 under the force of the spring 127. Thus, they engage each other. However, if the key slot 4c of the counter 4 and the key 126b of the drive shaft 126 do not coincide in phase with each other when, for example, the disc 1 has been already recorded halfway in the recording area with the cassette 3 loaded, the interlocking lever 66 and, therefore, the lock lever 60 remain in their states of having been turned counterclockwise. In that case, the switch 63 remains off. Therefore, power to the motor 51 is kept on and the motor 51 continues to rotate. While the motor 51 is thus rotating, since the exposure device shown in FIG. 2 has already been charged, the main charge lever 56, the mirror descent control lever 62 and the mirror uplift release lever 32 are idle and perform no action on the exposure device which is already charged. Meanwhile, the motor 51 causes the cam 59 to turn. Then, stepwise shifting of the head 105 and indexing rotation of the counter drive shaft 126 are alone performed.

With the stepwise shift of the head 105 and the indexing rotation of the counter drive shaft 126 having been carried out, when the phase of the key 126b of the drive shaft 126 coincides with the phase of the key slot 4c of the counter on the cassette 3, the force of the spring 127 moves the drive shaft 126 to the left as viewed in FIG. 4 to plunge the boss part 126a and the key 126b into the drive hole 4b and the key slot 4c of the counter 4. Then, following the displacement of the drive shaft 126, the interlocking lever 66 turns clockwise as viewed in FIG. 2. One end 60b of the charge shaft lock lever 60 is then released from the state of being pushed by the pin 66c of the lever 66. The spring 61 causes the lock lever 60 to bring the fore end lock part 60a into locking engagement with the recessed part 57a of the cam 57. The charge shaft 54 is thus locked. The switch 63 is then turned on to bring the motor 51 to a stop. The relative mounting angles of the cams 57 and 59 on the charge shaft 54 and the position of the lock part 60a of the lever 60 are determined in such a manner that the recessed part 57a of the cam 57 confronts the lock part 60a of the lever 60 after completion of the above head shifting operation by the cam 59 and the indexing rotation of the counter drive shaft 126.

When the rotation of the charge shaft 54 stops as described above, the head 105 is set in a position confronting a non-recorded track immediately following the last recorded track on the disc 1. When triggering of the camera is performed under this condition, the exposure device is operated in the manner described in the foregoing. The image sensor 11 is exposed to light. Then, on the basis of an image pick-up signal obtained from the image sensor 11, one field or frame portion of a video signal is recorded in the non-recorded track on the disc 1 through the head 105. When one field or frame portion of the video signal according to the NTSC system is to be recorded per turn of the disc 1, the disc 1 is rotated by the motor 102 either at a rate of 3,600 r.p.m. (field recording) or 1,800 r.p.m (framing recording).

In exposing the image sensor 11 to light, as described in the foregoing with reference to FIG. 2, the camera operates as follows. The charge shaft unlocking lever 34 is turned clockwise as the mirror 21 is uplifted. As a result, the charge shaft lock lever 60 is turned counterclockwise to release the cam 57 from the state of being locked by the lock part 60a of the lever 60. Therefore, when the motor 51 is started by arrangement, as will be described later, upon completion of recording the video signal on the magnetic disc 1, the charge shaft 54 is turned clockwise. Then, as has been described with reference to FIG. 2, the cam 58 causes the mirror descent control lever 62 to turn clockwise. This in turns causes the mirror uplift lever 32 to turn counterclockwise Therefore, the mirror 21 comes down. Following this, during the first half turn of the charge shaft 54, the cam 59 actuates the claw drive lever 131, as explained in the foregoing. The head 105 is thus shifted to a next track position and the counter 4 is advanced accordingly. Then, during the latter half turn of the charge shaft 54, the cam 55 causes the main charge lever 56 to turn clockwise as viewed in FIG. 2. The exposure device is then charged and reset as mentioned in the foregoing. When the charge shaft 54 makes just one turn, the lock part 62a of the lock lever 62 engages the recessed part of the cam 57 to lock the charge shaft 54. The switch 63 then turns on to bring the motor 51 to stop.

In other words, while the charge shaft 54 makes one turn, the head shifting or feeding device is urged during the first half turn and the exposure device is charged and reset during the latter or second half turn of the charge shaft 54. This arrangement disperses the load on the motor 51 to permit reduction in the torque thereof, lengthening its service life and reducing power consumption.

With the above-stated recording operation repeatedly performed, when the head 105 is shifted to a track position beyond the last track after completion of recording on the last track within the recording area on the disc 1, the end detection switch 147 is turned off by the pin 121a of the ratchet wheel 121. After that, the charge shaft 54 makes just one turn to be locked by the lock lever 60. The switch 64 is turned off. Then, as will be described later, power to all the circuits of the camera is cut off even with the power supply switch turned on. The camera, therefore, stops operating.

Furthermore, when the lid of the cassette loading chamber is opened for taking out the cassette 3 or when the cassette 3 is taken out, the operation member 146 comes down as viewed in FIG. 4. By this, the lever 142 is turned counterclockwise. Then, the lock claw release lever 143 is moved upward. The pin 143b of the lever 143 turns the lock claw 137 clockwise moving it away from the ratchet wheel 121. Furthermore, since the drive claw release lever 144 is turned clockwise by the upward movement of the lever 143, the pin 144c of the lever 144 turns the drive claw 135 clockwise to move it away from the ratchet wheel 121. With the cassette 3 taken out, when the counter drive shaft 126 is disengaged from the counter 4 of the cassette, the ratchet wheel 121 is freed. The spring 128 then causes the ratchet wheel 121 to turn clockwise until the pin 121a thereof comes to abut the stopper 139. The ratchet wheel 121 is thus brought back to its reset position. At that time, the pinion gear 124 is also turned clockwise. The slide plate 140 is thus moved upward. Accordingly, the head carriage 106 is also caused by the force of the spring 110 to come back to its reset position defined by the cam 122 and the pin 140a.

Figure 5:
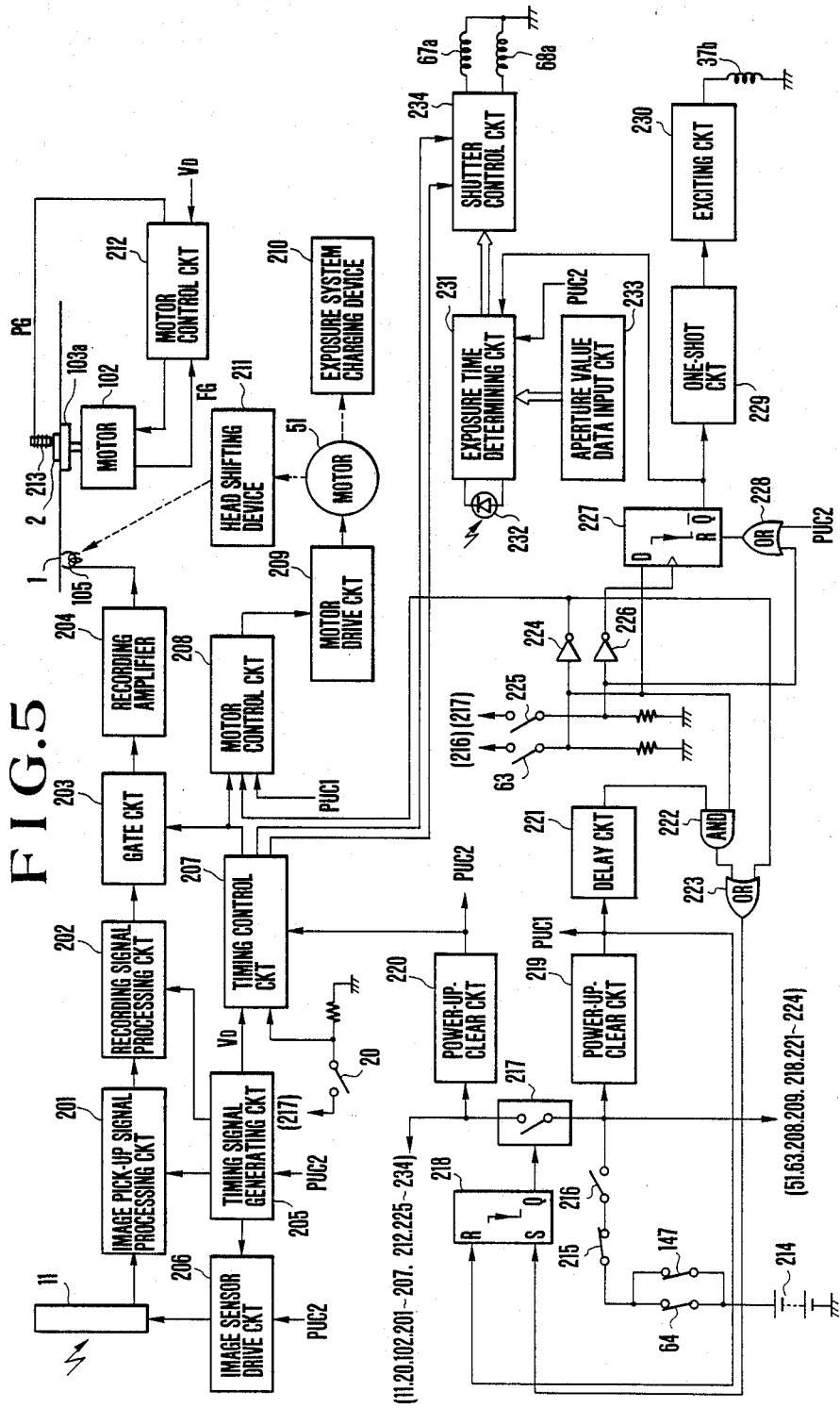
FIG. 5 is a circuit block diagram showing the arrangement of an electric circuit system in an embodiment of this invention.

The camera, which is mechanically arranged as described in the foregoing, has an electrical circuit system arranged as shown in FIG. 5. Referring to FIG. 5, the circuit system includes an image pick-up signal processing circuit 201 (or a video processing circuit) which is arranged, in a known manner, to process an image pick-up signal produced from the image sensor 11; a recording signal processing circuit 202 which is arranged to perform a process for recording such as modulation, etc., on a video signal produced from the image pick-up signal processing circuit 201; a gate circuit 203 which performs gating action on a recording signal produced from the recording signal processing circuit 202; a recording amplifier 204 which is arranged to supply the recording signal through the gate circuit 203 to the head 105 to have it recorded on the magnetic disc 1; a timing signal generating circuit 205 which is arranged to generate various synchronizing signals such as vertical and horizontal synchronizing signals and a timing circuit and to apply its output to the processing circuits 201 and 202.

The circuit system further includes an image sensor drive circuit 206 which drives the image sensor 11 based on the output of the timing signal generating circuit 205. A timing control circuit 207 controls, in response to turning on or closing of the switch 20 shown in FIG. 2, the operation timing of the shutter and signal recording timing on the basis of a vertical synchronizing signal VD produced from the timing signal generating circuit 205. The output of the timing control circuit 207 is applied to the gate circuit 203, to a motor control circuit 208 which controls the operation of the charging motor 51 as will be described later, to another motor control circuit 212 for the disc rotating motor 102 and to a shutter control circuit.

The motor control circuit 208 controls the operation of the charging motor 51 based on the output of the timing control circuit 207, the output of an inverter 224 the output level of which changes from high to low when the switch 63 of FIG. 2 turns on and a power-up-clear signal PUC1 which is produced from a first power-up-clear circuit when the power supply is switched on. A motor drive circuit 209 is arranged to drive the motor 51 under the control of the motor control circuit 208. An exposure system charging device 210 and a head shifting device 211, which are conceptually shown, are arranged to be operated by the motor 51 as have been described with reference to FIGS. 2 to 4. The motor control circuit 212 is arranged to control the rotation of the disc rotating motor 102 in the following manner. The motor 102 is controlled to rotate the disc 1 at a predetermined phase and at a predetermined speed 3,600 r.p.m. (or at 1,800 r.p.m.) as mentioned in the foregoing based on an FG signal (a tachometric signal) obtained from the motor 102, which is based on the output (a PG signal) of a rotation phase detector 13 which produces one pulse per turn of the disc 1 by detecting the magnetic pin 2e provided on the center core 2 of the disc 1 and also based on the vertical synchronizing signal VD obtained from the timing signal generating circuit 205. In other words, the circuit 212 performs speed and phase servo control operations.

A battery 214 is employed as the power source. A cassette loading detection switch 215 is arranged to turn on in response to loading of the cassette 3 as mentioned in the foregoing. The switch 215 is connected to the power source battery 214 via a parallel circuit consisting of the switches 64 and 147. A power supply switch 216 is series connected to the detection switch 215. A switching circuit 217 is arranged to control power to applicable circuits. An RS flip-flop 218 of the fall synchronizing type controls the switching circuit 217. First and second power-up-clear circuits 219 and 220 are arranged to produce power-up-clear signals PUC1 and PUC2 when the power supply switch 216 and the switching circuit 217 turn on respectively. A delay circuit 221 is arranged to delay, by a very short period of time, the power-up-clear signal PUC1 produced from the first power-up-clear circuit 219. An AND gate 222 is arranged to receive the output of the delay circuit 221 and a signal, the level of which becomes high when the switch 63 turns on. An OR gate 223 is arranged to receive the output of the AND gate 222 and the output of the inverter 224, the level of which changes from a high to a low level when the switch 63 turns on. The output of the OR gate 223 is arranged to be supplied to the set input terminal S of the flip-flop 218. The flip-flop 218 is arranged to be reset by the power-up-clear signal PUC1 produced from the first power-up-clear circuit 219. The switching circuit 217 is connected in such a way as to turn on when the Q-output level of the flip-flop 218 becomes high.

A trigger switch 225 is arranged to turn on when a trigger button (not shown) is operated. Inverters 224 and 226 are arranged to have their output levels change from high to low levels when the switch 63 and a switch 225 turn on, respectively. The output of the inverter 224 is arranged to be applied to the motor control circuit 208 and to the flip-flop 218 and that of the inverter 226 to the trigger input terminal of a D-flip-flop 227. The D-flip-flop 227 is of the fall synchronizing type and is arranged to have the potential of a node between the switch 63 and a resistor connected to the switch 63 applied to the D-input terminal thereof and to be triggered by the fall of the output of the inverter 226. An OR gate 228 is arranged to receive the power-up-clear signal PUC2 and the potential of a node between the switch 225 and a resistor connected to the switch 225. The output of the OR gate 228 is arranged to be applied to the reset input terminal R of the flip-flop 227. A one-shot circuit 229 is arranged to produce a single pulse in response to the fall of the Q-output of the flip-flop 227 for a predetermined period of time, i.e., for a sufficient period of time for enabling the electromagnet 37 shown in FIG. 2 to release he attraction piece 43 of the lever 41 with power supplied to the coil 37b thereof. An exciting circuit 230 supplies power to the coil 37b while the output of the one-shot circuit 229 is at a high level. A known digital exposure time determining circuit 231 is arranged to determine an exposure time in a digital value based on a brightness signal obtained from a known TTL photometric element 232 disposed in a view finder optical path and digital data on a preset aperture value obtained from a preset aperture value data input circuit 233 and to store the digital exposure time value in response to a low level of the $\overline{Q}$-output of the flip-flop 227. A shutter control circuit 234 is arranged to control timing for the travels of the leading and trailing shutter blades 13 and 14, which are shown in FIG. 2, on the basis of the timing signal from the timing signal generating circuit 207 and the exposure time data from the exposure time determining circuit 231. More specifically, the shutter control circuit 234 controls power to the coil 67a of the leading blade holding electromagnet 67 and the coil 68a of the trailing blade holding electromagnet 68 shown in FIG. 2.

In the circuit system described, the circuit elements 51, 63, 208, 209, 218 and 221-224 are arranged to receive power directly from the power source battery 214 with the power supply switch 216 turned on, i.e., not through the switching circuit 217. On the other hand, the circuit elements 11, 20, 102, 201-207, 212 and 225-234 receive power via the switching circuit 217. Furthermore, the power-up-clear signal PUC2 from the second power-up-clear circuit 220 is also applied to the circuit elements 205-207 and 231 besides the OR gate 228.

Figure 6:
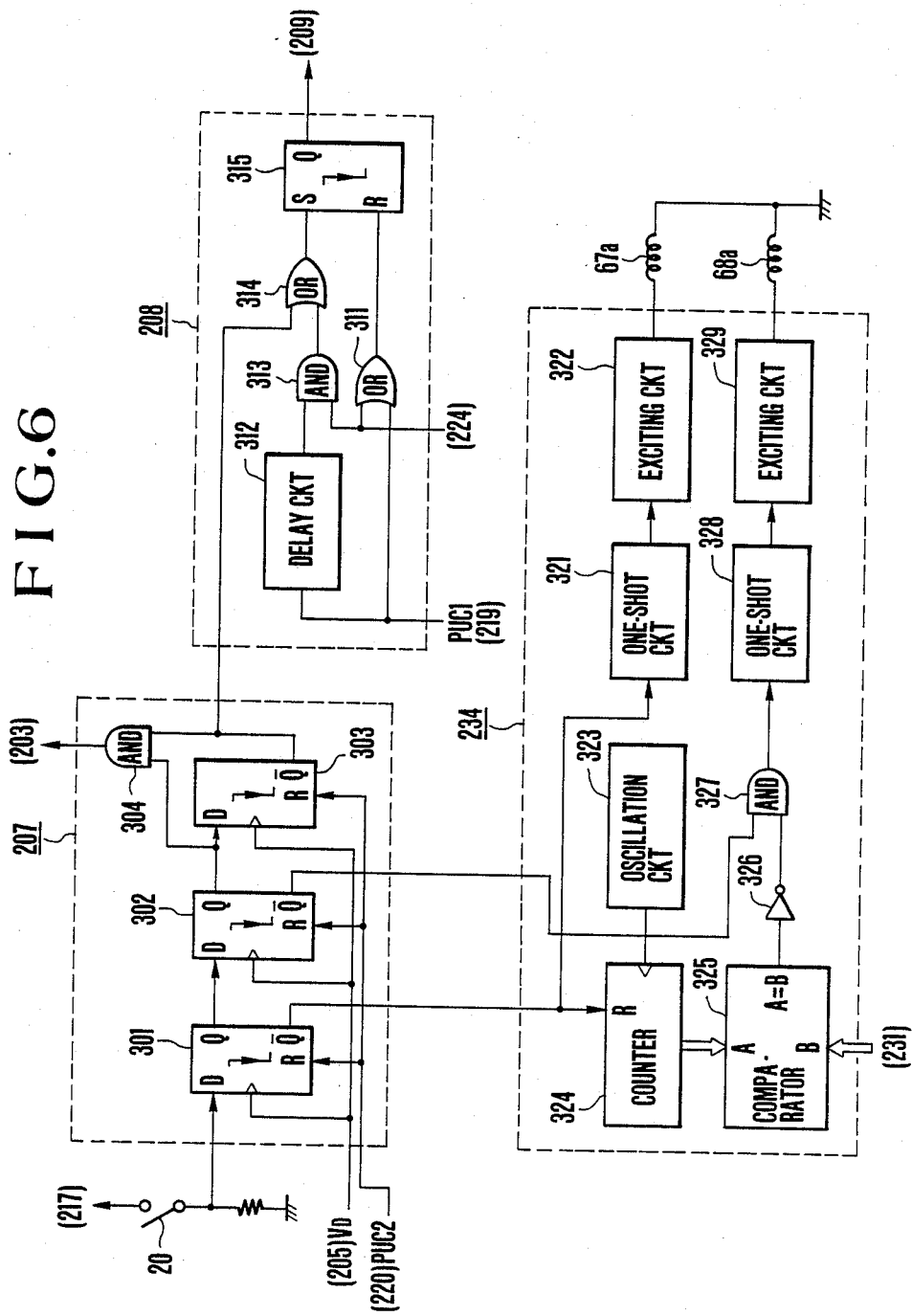
FIG. 6 is a circuit block diagram showing, by way of example, the specific arrangement of a timing control circuit, a charging motor control circuit and a shutter control circuit which are included in the circuit system shown in FIG. 5.

A specific example of an arrangement for the timing control circuit 207, the motor control circuit 208 and shutter control circuit 233 is shown in FIG. 6.

Referring to FIG. 6, the timing control circuit 207 consists of three fall synchronizing type D-flip-flops 301, 302 and 303 and an AND gate 304. The flip-flops 301-303 are all arranged to be reset by the power-up-clear signal PUC2 from the second power-up-clear circuit 220 and to be triggered by the fall of the vertical synchronizing signal VD from the timing signal generating circuit 207. The flip-flop 301 of the primary stage is arranged to receive, at its D-input terminal, the potential of a node between the switch 20 and a resistor connected thereto. The AND gate 304 receives the Q-output of the middle stage flip-flop 302 and the $\overline{Q}$- output of the last stage flip-flop 303 and to apply the output thereof to the gate circuit 203. The Q-outputs of the flip-flops 302 and 303 are applied as timing control signals to the shutter control circuit 233 and the motor control circuit 208, respectively.

Next, the motor control circuit 208 consists of OR gates 311 and 314; circuit 312; an AND gate 313; and a fall synchronizing type RS-flip-flop 311. The OR gate 311 is arranged to receive the power-up-clear signal PUC1 from the first power-up-clear circuit 219 and the output of the inverter 224. The output of the OR gate 311 is arranged to be applied to the reset input terminal R of the flip-flop 315. The delay circuit 312 is arranged to delay the clear signal PUC1 for a very short period of time. The AND gate 313 is arranged to receive the output of the delay circuit 312 and that of the inverter 224. The OR gate 314 is arranged to receive the output of the AND gate 313 and the $\overline{Q}$-output of the flip-flop 303 of the timing control circuit 207, while the output of the OR gate 314 is arranged to be applied to the set input terminal S of the flip-flop 315. The Q-output of the flip-flop 315 is applied as a control signal to the motor drive circuit 209.

The shutter control circuit 234 consists of one-shot circuits 321 and 328; exciting circuits 322 and 329; a counter 324; a digital comparator 325; an inverter 326; and an AND gate 327. The one-shot circuit 321 is arranged to produce a single pulse in response to the fall of the $\overline{Q}$-output of the flip-flop 301 of the timing control circuit 207. The exciting circuit 322 supplies power to the coil 67a in response to the pulse from the one-shot circuit 321 while the pulse is at a high level and thus to release the leading shutter blade 13. The counter 324 is arranged to be reset by the high level of the $\overline{Q}$-output of the flip-flop 301 and is enabled, by the low level of the $\overline{Q}$output, to count the clock pulses produced from an oscillation circuit 323. The comparator 325 is arranged to compare a count value (A) of the counter 324 with the output data (B) of the exposure time determining circuit 231. When the two coincide with each other (A=B), the comparator 325 produces an "A=B" output at a high level. This "A=B" output is inverted by the inverter 326. The inverted output is applied to the AND gate 327, which is receiving the $\overline{Q}$-output of the flip-flop 302.

As will be understood from further description later, the counter 324, the comparator 325 and the inverter 326 jointly form a circuit which controls the open time of the shutter 13 and 14 on the basis of the data produced from the exposure time determining circuit 231. In this regard, the AND gate 327 serves to determine the limit of the shutter open time on the longer time side thereof on the basis of the timing signal from the timing control circuit 207 (or the $\overline{Q}$-output of the flip-flop 302) at a period of time corresponding to one field, that is, at 1/60 second in this case.

In response to the fall of the output level of the AND gate 327, the one-shot circuit 328 produces a single pulse. Then, in response to this, the exciting circuit 329 supplies power to the coil 68a for a period of time during which the pulse is at a high level. The trailing shutter blade 14 is released with the coil 68a thus energized.

The time constants, etc., of the one-shot circuits 321 and 328 are selected to produce single pulses which remain at a high level for a sufficiently long time for releasing the leading and trailing shutter blades 13 and 14 from the attraction of the permanent magnets 37a, 104 in the same manner as in the case of the one-shot circuit 224 which is shown in FIG. 5.

Figure 7:
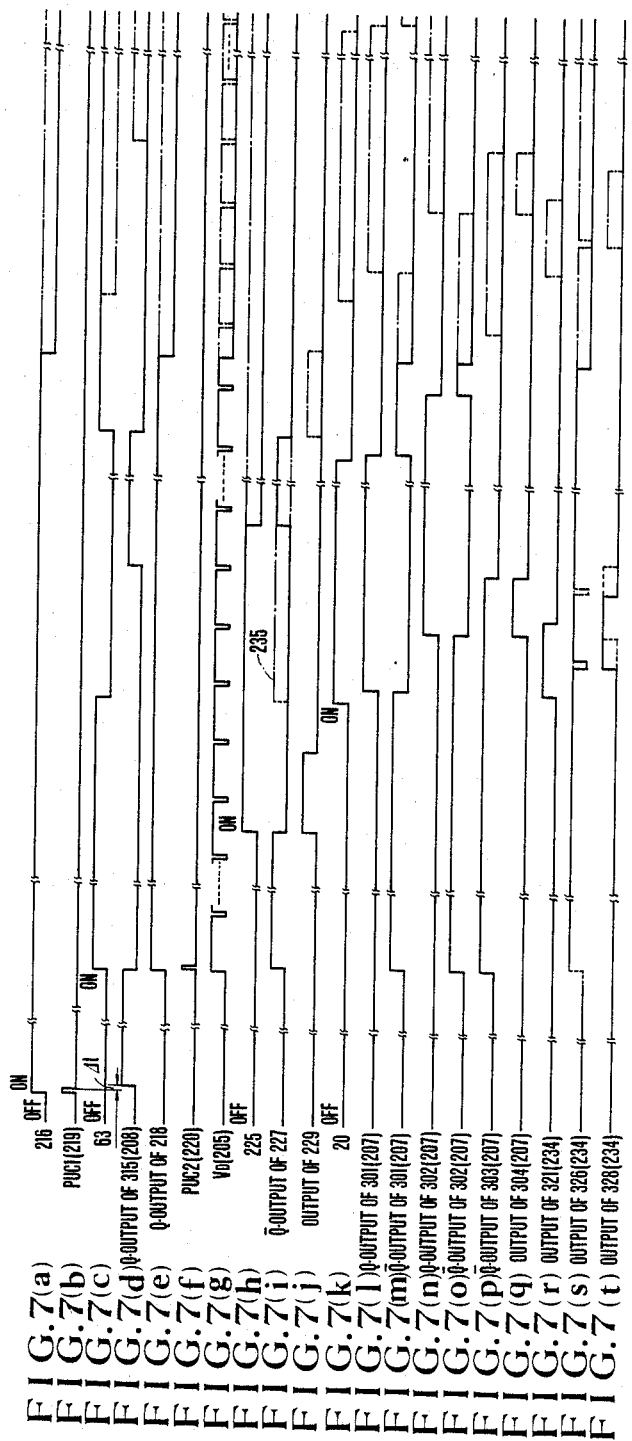
FIG. 7(a)-7(t) are to a timing chart showing the inputs and outputs of essential circuits included in the circuit system of FIG. 5 during the operation thereof.

Referring to FIGS. 7(a) to 7(t), the electrical circuit system which is arranged as described above operates in the following manner. The detection switch 215 first turns on when the camera is loaded with the cassette 3. Under this condition, when the power supply switch 216 is turned on (see FIG. 7(a)), power is supplied from the power source battery 214 to the circuit elements 51, 63, 208, 209, 215, 218, 219 and 221-224. The first power-up-clear circuit 219 then produces the power-up-clear signal PUC1 as shown in FIG. 7(b). This clear signal PUC1 resets the flip-flop 218 and the flip-flop 315, etc., of the motor control circuit 208.

At that time, the switch 63 is off if the phase of the key 126b of the counter drive shaft 126 does not coincide with that of the key slot 4c of the counter 4 of the cassette 3. In that case, the flip-flop 315 is reset by the clear signal PUC1 and is set by the output of the delay circuit 312 produced after the lapse of a delay time Δt delayed by the delay circuit 312. Thus, the Q-output of the flip-flop 315 becomes a high level as shown in FIG. 7(d). This causes the motor drive circuit 209 to start the charging motor 51. The head shifting device 211 then shifts the head 105 in the manner mentioned in the foregoing.

The driving action of the motor 51 continues, as mentioned in the foregoing, until the phase of the key 126b of the counter drive shaft 126 coincides with that of the key slot 4c of the counter 4 of the cassette 3 and the two engage each other. When they engage with their phases coinciding with each other, the switch 63, which has been off until then, turns on as shown in FIG. 7(c). Therefore, the flip-flop 315 is reset and the level of the Q-output thereof becomes low as shown in FIG. 7(d). The motor 51 then stops. Furthermore, with the switch 63 turned on, the flip-flop 218 is set and the level of its Q-output becomes high as shown in FIG. 7(e). This causes the switching circuit to turn on to supply power to the circuit elements 11, 20, 201–207, 212, 220 and 224–234. Then, as shown in FIG. 7(f), the power-up-clear signal PUC2 is produced from the second power-up-clear circuit 220 to reset the circuits 205–207, 227 and 231. Therefore, the motor 102 drives the disc 1 to begin to rotate. The image pick-up system then begins to operate although it is not exposed to light. The recording signal processing circuit 202 then produces and supplies a recording signal to the gate circuit 203. The timing signal generating circuit 205 produces and supplies the vertical synchronizing signal VD to the timing control circuit 207 and the motor control circuit 212 as shown in FIG. 7(g). Furthermore, at that time, the level of the $\overline{Q}$-output of the flip-flop 227 becomes high causing the exposure time determining circuit 231 to determine an apposite length of exposure time on the basis of the output of the photometric element 232 and a preset aperture value data from the aperture value data input circuit 233 as shown in FIG. 7(i).

Referring to FIG. 7(h), when the trigger switch 225 is turned on under this condition, the flip-flop 227 is triggered and the level of its $\overline{Q}$-output becomes low, causing the exposure time determining circuit 231 to store or to hold the exposure time value determined at that point of time as shown in FIG. 7(i). Meanwhile, as shown in FIG. 7(j), the one-shot circuit 229 produces a single pulse. In response, 230 supplies power to the coil 37b of the electromagnet 37. As has been described with reference to FIG. 2 in the foregoing, with the coil 37 thus energized, the aperture stopping-down and mirror uplifting operations are carried out. Upon completion of the uplifting operation on the mirror 21, the switch 63 turns off as shown in FIG. 7(c) and the switch 20 turns on as shown in FIG. 7(k). With the switch 20 having turned on, a fall of the vertical synchronizing signal VD, which takes place immediately after that, triggers the primary stage flip-flop 301 of the timing control circuit 207 to cause the level of the Q-output thereof to change from a low level to a high level and the level of its $\overline{Q}$-output from a high level to a low level as shown in FIGS. 7(l) and (m). Then, the fall of the $\overline{Q}$-output thus produced causes the one-shot circuit 321 of the shutter control circuit 234 to produce a single pulse as shown in Fig. 7(r). In response to the single pulse, the exciting circuit 322 supplies power to the coil 67a of the leading shutter blade holding electromagnet 67. Therefore, as has been described with reference to FIG. 2, the leading shutter blade 13 travels to initiate an exposure process on the image sensor 11. Furthermore, with the level of the $\overline{Q}$-output of the flip-flop 301 becoming low, the counter 324, which is also included in the shutter control circuit 234, is released from reset and begins to count the pulses produced from the oscillation circuit 323. Then, if the exposure time which has been determined by the exposure time determining circuit 231 is shorter than 1/60 second and the count value (A) of the counter 324 coincides with the data (B) produced from the exposure time determining circuit 231 before the lapse of 1/60 second after the above-stated flip-flop 301 is triggered, the level of the "A=B" output of the comparator 325 changes at that point of time from a low level to a high level. Then, as shown in FIG. 7(s), the output level of the inverter 326 changes from a high level to a low level, to cause the output level of the AND gate 327 to change from a high level to a low level. At this point of time, the $\overline{Q}$-output of the flip-flop 302, which is included in the timing control circuit 207, still remains at a high level as shown in FIG. 7(o). Then, the one-shot circuit 328 produces a single pulse as shown in FIG. 7(t). In response to the single pulse, the exciting circuit 329 supplies power to the coil 68a of the trailing shutter blade holding electromagnet 68. Accordingly, as has been described with reference to FIG. 2, the trailing shutter blade 14 travels to bring the exposure process on the image sensor 11 to an end.

If the exposure time determined by the exposure time determining circuit 231 is 1/60 second or above it, a vertical synchronizing signal VD which is produced after the flip-flop 301 of the primary stage in the timing control circuit 207 is triggered triggers the flip-flop 302 as shown in FIGS. 7(n) and 7(o). The level of the Q-output of the flip-flow 302 then changes from a low level to a high level while its $\overline{Q}$-output changes from a high level to a low level. This change of the $\overline{Q}$-output from a high to a low level causes the output level of the AND gate 327 of the shutter control circuit 234 to change from a high level to a low level. Therefore, as shown by a broken line in FIG. 7(t), the one-shot circuit 328 produces a single pulse. Accordingly, the trailing shutter blade 14 begins to travel at that instant. Thus, in this instance, the exposure time on the image sensor 11 is limited to 1/60 second. A broken line in FIG. 7(s) shows, by way of example, the change of the output of the inverter 326 which takes place in this case.

When the level of the Q-output of the flip-flop 302 becomes high, the output level of the AND gate 304 of the timing control circuit 207 becomes high, as shown in FIG. 7(q). This high level output of the AND gate 304 turns on the gate circuit 203. With the circuit 203 turned on, in reading out an image pick-up signal obtained at the image sensor 11 during the above-stated exposure time, a recording signal which is produced on the basis of the read-out image pick-up signal is applied from the recording signal processing circuit 202 via the gate circuit 203 to the recording amplifier 204. As a result, the recording signal is recorded via the head 105 in one of the recording tracks on the disc 1. Following this, another vertical synchronizing signal VD which is produced next triggers the flip-flop 303 of the timing control circuit 207. The level of the $\overline{Q}$-output of the flip-flop 303 then becomes low as shown in FIG. 7(p). The output level of the AND gate 304 also becomes low as shown in FIG. 7(q). The gate circuit 203 turns off and the recording process comes to an end. Meanwhile, with the $\overline{Q}$-output of the flip-flop 303 changing from a high level to a low level, the flip-flop 315 of the motor control circuit 208 is set and the level of the Q-output thereof becomes high as shown in FIG. 7(d). This starts the motor 51. The head shifting device 211 shifts the head 105 to a next track position and the exposure system charging device 212 charges the exposure device. When the charge shaft 54 makes just one turn to turn on the switch 63 as shown in FIG. 7(c), the flip-flop 315 is reset and the level of the Q-output thereof becomes low as shown in FIG. 7(d). This brings the motor 51 to a stop.

Then, for the next picture-taking operation, the trigger switch 225 is turned off once and, after that, again turned on. With the trigger switch 225 turned off, the flip-flop 227 is reset. The level of the $\overline{Q}$-output of the flip-flop 227 again becomes high. This causes the exposure time determining circuit 231 to operate again to determine an apposite exposure time value. Following this, when the trigger switch 225 is turned on, the flip-flop 227 is triggered. The $\overline{Q}$-output level of the flip-flop 227 becomes low. Then, as mentioned in the foregoing, the exposure time determining circuit 231 stores or holds the data of the exposure time value determined. Meanwhile, the one-shot circuit 229 produces a single pulse to release the mirror 21. Under this condition, as a result of resetting of the mirror 21 by the rotation of the charging motor 51, the switch 20 turns off to make the levels of the Q-outputs of all the flip-flops 301–303 of the timing control circuit 207 low and the levels of their $\overline{Q}$-outputs high. Therefore, as mentioned in the foregoing, the mirror 21 ascends and again the switch 20 turns on. Then, the timing for the travels of the shutter blades 13 and 14 and the on-and-off operation of the gate circuit 203 are controlled in the same manner as has been described in the foregoing. Upon completion of recording, the charging motor 51 is started; the mirror 21 is reset; the head 105 is shifted to a next track position; and the exposure device is charged in the same manner as described in the foregoing.

If the power supply switch 216 is turned off with the motor 51 in respose as mentioned in the foregoing, the power source turns off with the camera having completed preparation for picture-taking. In this case, this can be accomplished through the processes described above by again turning on the power supply switch 216 and the trigger switch 225, one after the other. Furthermore, in this case, the switch 63 is already turned on before the power supply switch 216 is turned on. The output level of the inverter 224, therefore, becomes low. In the motor control circuit 208, the flip-flop 315 remains reset by the power-up-clear signal PUC1 and is not set. Accordingly, the motor 51 is not started. Since the switch 63 is turned on, the flip-flop 218 is reset by the power-up-clear signal PUC1 and, after that, is set by the output of the delay circuit 221 after the lapse of a length of time delayed by the delay circuit 221. Therefore, in this case, the switching circuit 217 turns on when the length of time delayed by the delay circuit 221 has lapsed after the power-up-clear signal PUC1 is produced. With the switching circuit 217 thus turned on, power is supplied to the circuit elements 11, 20, 102, 201–207, 212 and 225–234.

With recording completed in the last of the recording tracks within a predetermined recording area on the disc 1, when the head 105 is further shifted by one track pitch, the end detecting switch 147 turns off as mentioned in the foregoing with reference to FIG. 4. Following this, when the switch 64 turns off with the charging process on the exposure device completed and the charge shaft 54 locked by the charge shaft lock lever 60, power to the whole circuit system comes to stop even if the power supply switch 216 is turned on. Therefore, at that instant, the camera stops operating.

In the embodiment described above, the picture-taking operation is accomplished once every time the trigger switch 225 is turned on. However, this invention is not limited to such a single-shot picture-taking function but is also advantageously applicable to a successive-shot picture-taking function, in which the camera repeatedly performs picture-taking at a predetermined rate in a successive manner as long as the trigger switch 225 remains on.

Figure 8:
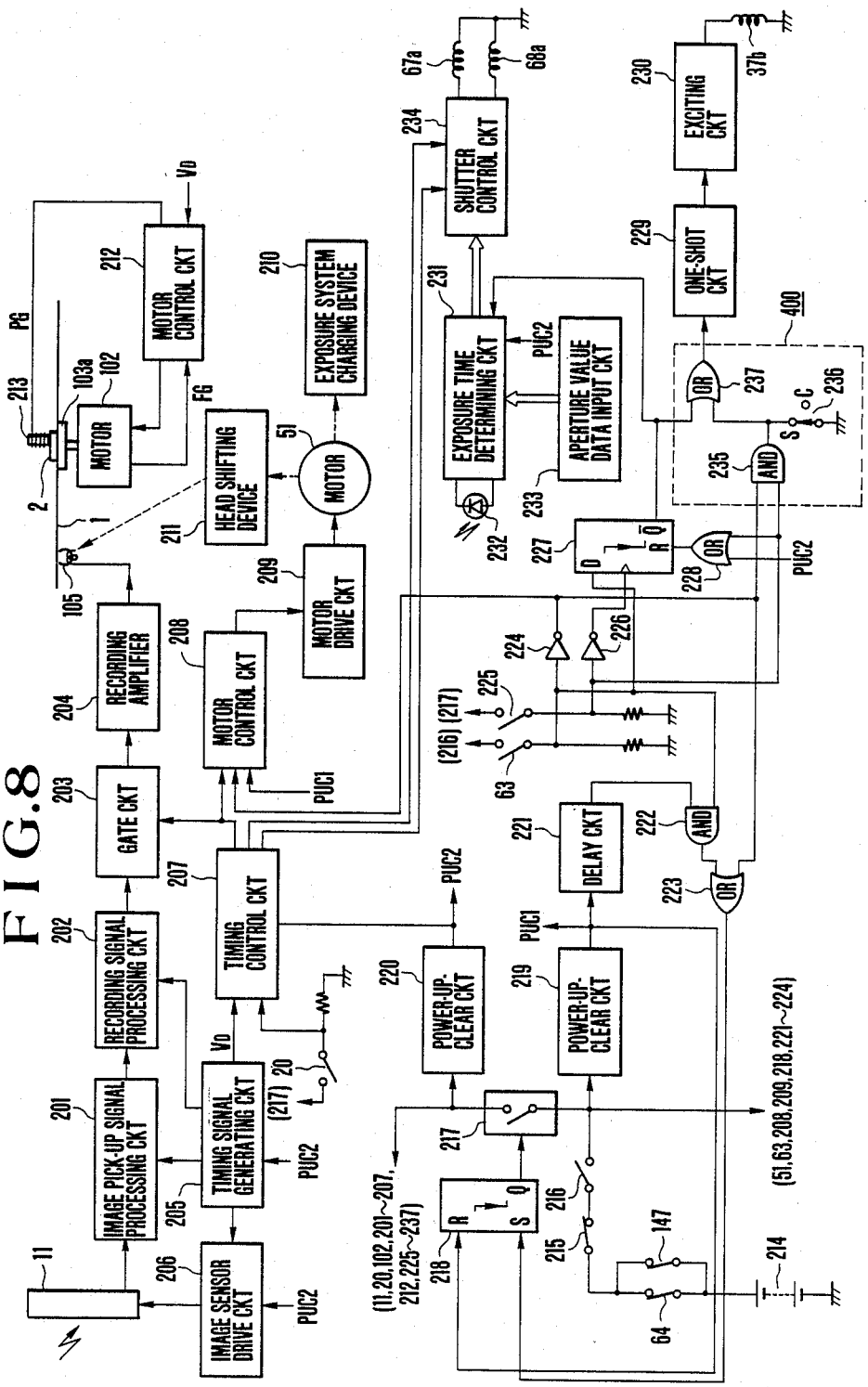
FIG. 8 is a circuit block diagram showing an electric circuit system in another embodiment of the invention which is arranged to permit switch-over between a single-shot mode and a successive-shot mode.

FIG. 8 shows another embodiment of the invention in which the above-stated successive shot function is included. In this case, a circuit which is required for switch-over between a single-shot mode and a successive-shot mode is added to the circuit system shown in FIG. 5. Referring to FIG. 8, the whole arrangement of the additional circuit is indicated by a reference numeral 400. The additional circuit 400 includes an AND gate 235 which is arranged to receive the output of the inverter 224 and the potential of a node between the trigger switch 225 and a resistor connected to the switch 225; a mode selection switch 236 which is arranged to connect the output of the AND gate 235 to a circuit ground in the above-stated single-shot mode S and does not connect it to the circuit ground in the case of the above-stated successive-shot mode C; and an OR gate 237 which is arranged to receive the output of the AND gate 235 and the $\overline{Q}$-output of the flip-flop 227. In this case, the output of the OR gate 237 is arranged to be applied as a trigger signal to the one-shot circuit 229. (In the case of the circuit system of FIG. 5, the $\overline{Q}$-output of the flip-flop 227 is directly applied as a trigger signal to the one-shot circuit 229). The circuit system of FIG. 8 differs from that of FIG. 5 only in the above-stated portions.

In the single-shot mode S, since the output level of the AND gate 235 is kept low since the output terminal of the AND gate 235 is connected to the circuit ground by the switch 236, the OR gate 237 is responsive solely to the $\overline{Q}$-output of the flip-flop 227. Therefore, in the same manner as in the circuit system of FIG. 5, picture-taking is performed once every time the trigger switch 225 is turned on.

In the successive-shot mode C, the switch 236 is switched to connect the output terminal of the AND gate 235 to the circuit ground. Therefore, the OR gate 237 is responsive to both the $\overline{Q}$-output of the flip-flop 227 and the output of the AND gate 235. Therefore, when the trigger switch 225 is turned on with the camera being completely ready for the next picture-taking session and thus with the switch 63 being on, the flip-flop 227 is triggered and the $\overline{Q}$-output thereof changes from a high level to a low level to initiate the picture-taking operation as described in the foregoing. After that, if the trigger switch 225 is kept on as indicated by a one-dot-chain line in FIG. 7(h), the charging motor 51 is started upon completion of the first picture-taking shot. Then, as mentioned in the foregoing, the mirror 21 is reset; the head 105 is shifted to a next track position; and the exposure device is charged, causing the switch 63, which was turned off at the time of triggering, to turn on. The instant the switch 63 turns on, the output level of the AND gate 235, which becomes high when the switch 63 was turned off, now becomes low as shown by a one-dot-chain line in FIG. 7(i). At that time, since the $\overline{Q}$-output of the flip-flop 227 still remains at a low level, the output of the OR gate 237 changes from a high level to a low level. Then, as shown by a one-dot-chain line in FIG. 7(j), the one-shot circuit 229 is again triggered to again trigger the camera.

These processes of operation are repeatedly performed as long as the trigger switch 225 is kept on and the camera performs picture-taking in the successive-shot mode C. The one-dot-chain lines in FIGS. 7(a)-7(t) show the inputs and outputs of the various circuit elements in the successive-shot mode C. When the trigger switch 225 is turned off during the picture-taking photography operation in the successive-shot mode C, the operation of that round is finished and the camera stops operating after having completed preparation for a next picture-taking operation.

In the successive-shot mode C, the level of the $\overline{Q}$-output of the flip-flop 227 remains low and, therefore, the exposure time value, which is determined in the first round of picture-taking operations, remains unchanged. Furthermore, in this case, the picture-taking rate, i.e., the number of recurring picture-taking shots per unit time is determined solely by the rotating speed of the motor 51 and a length of time required for the operation of the mechanical arrangement of the camera. Therefore, the rotating speed of the motor 51 may be arranged to be variable to make the picture-taking rate variable for the successive-shot mode C.

In a further embodiment of this invention, the picture-taking lens of the camera which is described as another embodiment of the invention in the foregoing, for example, is provided with an automatic focusing device.

First, referring to FIG. 9, an example of the automatic focusing device, usable in accordance with this invention, is mechanically arranged in the following manner.

A picture-taking lens system, which has an optical axis 0, includes a focusing lens 71; and a focusing ring 72 which is rotatable about the optical axis 0 and is interlocked with the focusing lens 71 via a known suitable mechanism such as a helicoid or cam mechanism. The focusing lens 71 is arranged to shift its position back and forth along the optical axis as the focusing ring 72 rotates.

In this embodiment, the focusing lens 71 is arranged to be caused by a lens shifting device (not shown) to move backward from the nearest distance focusing position toward the longest or infinity distance focusing position when the focusing ring 72 rotates clockwise.

A distance cam 72a is formed along the rear end face of the focusing ring 72. A pin 72b is secured to the rear end face of the ring 72. A focusing ring driving spring 73 is attached to the ring 72 and is the charging means for causing the focusing ring 72 to rotate clockwise on the optical axis 0. A ratchet toothed part 74 is formed on the periphery of the focusing ring 72. A stopper member 75 is pivotally carried by a shaft 75a and is provided with a claw part 75b for engaging the ratchet toothed part 74. A spring 76 urges the stopper member 75 to turn on the shaft 75a clockwise, or in a direction to bring the claw part 75b into engagement with the ratchet toothed part 74. An electromagnet 77, which is formed by winding a coil 77b around an iron core 77a, disengages the claw part 75a of the stopper member 75 from the ratchet part 74 by attracting a bent part 75c of the member 75 to cause it to turn counterclockwise against the force of the spring 76.

A sweep lever 78 is pivotally carried by a shaft 78a. A spring 79 urges the sweep lever 78 to turn clockwise on the shaft 78a and to have a cam follower pin 78b which is secured o the fore end of one of the arms thereof constantly abutting the distance cam 72a of the focusing ring 72. A bent up part 78c which, if formed at the fore end part of the other arm of the lever 78, carries a light emitting element 80 (an infrared ray emitting diode in this case). A light projecting lens 82 is fixedly arranged in front of the light emitting element 80 to project a light emitted by the light emitting element 80 on an object. A light receiving lens 83 is fixedly arranged away from the lens 82 by a predetermined base length in the lateral direction. A photo-sensitive element 81 (a silicon photo-cell in this case) is arranged approximately at the focal point of the light receiving lens 83 to receive light from the light receiving lens. The element 81 processes a photo sensitivity that gives a peak value for the wave length of the light emitted from the light emitting element 80.

The distance cam 72a, which is formed at the rear end of the focusing ring 72, has such a shape that when the light emitting element 80 is moved clockwise with the sweep lever 78 moved by the action of the spring 79 by the clockwise rotation of the focusing ring 72, the main projection axis of a light flux projected through the light projecting lens 82 can, by the cam 72a, continuously sweep objects from the nearest to infinity.

A gear 84 is attached to the lowest end of the charge shaft 54, which has been described in the foregoing with reference to FIG. 2. A gear 85, which is of the same diameter and has the same number of teeth as the gear 84, is arranged to engage the gear 84. A gear 86 is formed coaxially and in one unified body with the gear 85. A pinion gear 87 is arranged to engage the gear 86. The gear 86 is provided with a cut-away part 86a for disengagement from the pinion gear 87. The gear 86 is coupled with the gear 85 in such a manner that when the charge shaft 54 is locked by the lock lever 60 as has been described in the foregoing with reference to FIG. 2, this cut-away part 86a is confronting the pinion gear 87 as shown in FIG. 9. A slide member 88 is provided with a rack part 88a which is arranged to engage the pinion gear 87. A pin 89 engages a slot 88c of the slide member 88 to permit the slide member to be slid right and left as viewed in the drawing. A hook part 88b is formed at the fore end of the slide member 88 to be capable of engaging a pin 72b disposed at the rear end of the focusing ring 72. When the slide member 88 is moved to the right, as viewed in FIG. 9 by the clockwise rotating operation of the charge shaft 54, the engagement between the hook part 88b and the pin 72b causes the adjustment ring 72 to be rotated counterclockwise against the force of the spring 73 until the foremost tooth 74a of the ratchet part 74 comes to engage and to be locked by the claw part 75b of the stopper member 75. At that time, the spring 73 is charged. The slide member 88 is urged to the left as viewed in FIG. 9 by a spring 90 which is arranged between pins 88d and 89.

A stopper pin 91 is provided for the focusing ring 72. When the pin 72b of the focusing ring 72 abuts the stopper pin 91, the focusing lens 71 is stopped in an infinity distance focusing position. A camera trigger button 92 is arranged in one unified body with a triggering rod 93. A pin 93a pierces the triggering rod 93 sidewise. A spring 94 is arranged to urge the triggering rod 93 upward through the pin 93a. The trigger switch 225, which is mentioned in the foregoing (FIGS. 5 and 8), is arranged to be turned on by this pin 93a when the triggering rod 93 is pushed down. The automatic focusing device, which is arranged in this manner, operates as follows.

Under the charging completed condition as shown in the drawing, when the trigger button 92 is pushed to push down the triggering rod 93 against the force of the spring 94, the trigger switch 225 is turned on. This actuates an automatic focusing circuit which will be described later. The automatic focusing circuit drives the light emitting element 80 and excites the electromagnet 77 by supplying to the coil 77b thereof. With the electromagnet 77 excited, the stopper member 75 is attracted by the electromagnet 77 and turns counterclockwise against the force of the spring 76. Therefore, the fore end tooth 74a of the ratchet part 74 of the focusing ring 72 is unlocked and disengaged from the stopper member 75. The focusing ring 72 is thus allowed to be rotated clockwise by the acting force charged at the focusing ring driving spring 73. The clockwise rotation of the ring 72 shifts the focusing lens 71 from the nearest toward the longest or infinity distance focusing position. Following this, the sweep lever 78 turns clockwise to cause the light emitting element 80 to make a sweeping turn in the same direction. During the shifting process of the lens 71 and the sweeping action of the light emitting element 80, the automatic focusing circuit detects a peak of reflected light on the basis of the output of the photo-sensitive or light receiving element 81, i.e., an in-focus position of the lens 71. Upon detection of the in-focus position, power to the electromagnet 77 is cut off. Then, the stopper member 75 is released from the attraction of the electromagnet 77. The stopper member 75 is then caused by the force of the spring 76 to lock the ratchet part 74 and thus to bring the rotation of the focusing ring 72 to a stop. The picture-taking lens system is thus focused on the object.

Upon completion of the focusing operation of the picture-taking lens system, a focusing completion signal from the automatic focusing circuit causes power to be supplied to the electromagnet 37 of FIG. 2 to initiate operation of the exposure device mentioned in the foregoing.

After completion of picture-taking, when the charge shaft 54 is turned clockwise, as mentioned in the foregoing, the slide member 88 slides to the right via the gears 84–86 against the force of the spring 90. Then, the focusing ring 72 is rotated counterclockwise with the pin 72b pushed by the hook part 88b of the slide member 88. By this, the focusing lens 71 is shifted to the nearest focusing position. The sweep lever 78 is then turned counterclockwise against the force of the spring 79 and the adjustment ring driving spring 3 is charged. When the charge shaft 54 just completes one turn, the cutaway part 86a of the gear 86 comes to confront the pinion gear 87. Therefore, the force of the spring 90 brings the slide member 88 back to the left position in the drawing. Accordingly, the spring 73 urges the focusing ring 2 to rotate clockwise. However, since the electromagnet 77 is not excited at that time, the claw part 75b of the stopper member 75 comes to engage the fore end tooth 74a of the ratchet toothed part 74 and thus keeps the ring 72 in the reset position as shown in the drawing.

A charging operation on the automatic focusing device is thus completed.

After the automatic focusing device is charged, the slide member 88 remains inactive on the device as long as the device is not released from the charged state. Therefore, when the charge shaft 54 is repeatedly turned until the phase of the key 126b of the drive shaft 126 of FIG. 4 coincides with that of the key slot 4c of the counter 4 of the loaded cassette 3 as mentioned in the foregoing, the slide member 88 charges the automatic focusing device during the first turn of the charge shaft if the device remains released at that time. After that, however, the slide member 88 remains idle and does not act on the automatic focusing device any longer during the ensuing turns of the charge shaft 54.

The charging system for the above-stated automatic focusing device is arranged to charge the automatic focusing device by utilizing approximately one turn of the charge shaft 54. However, in consideration of the load on the motor 51, the automatic focusing device may be arranged to be charged concurrently with shifting of the head 105 during the first half turn of the charge shaft 54 during which the load is relatively light. Such a modification is possible by adequately changing the diameter of the gear 86, the dimensions of its cutaway part 86a thereof, etc. In another possible modification in this respect, the mounting angles of the cams 55 and 59 on the charge shaft 54 and the above gear 86 are designed to have the shifting action on the head 105, the charging action on the exposure device and the charging action on the automatic focusing device all carried out in a time sharing manner.

In picture-taking, the automatic focusing device operates prior to operation of the exposure device. Accordingly, the image sensor 11 is arranged to be exposed to light after completion of the focusing operation of the picture-taking lens system.

Figure 10:
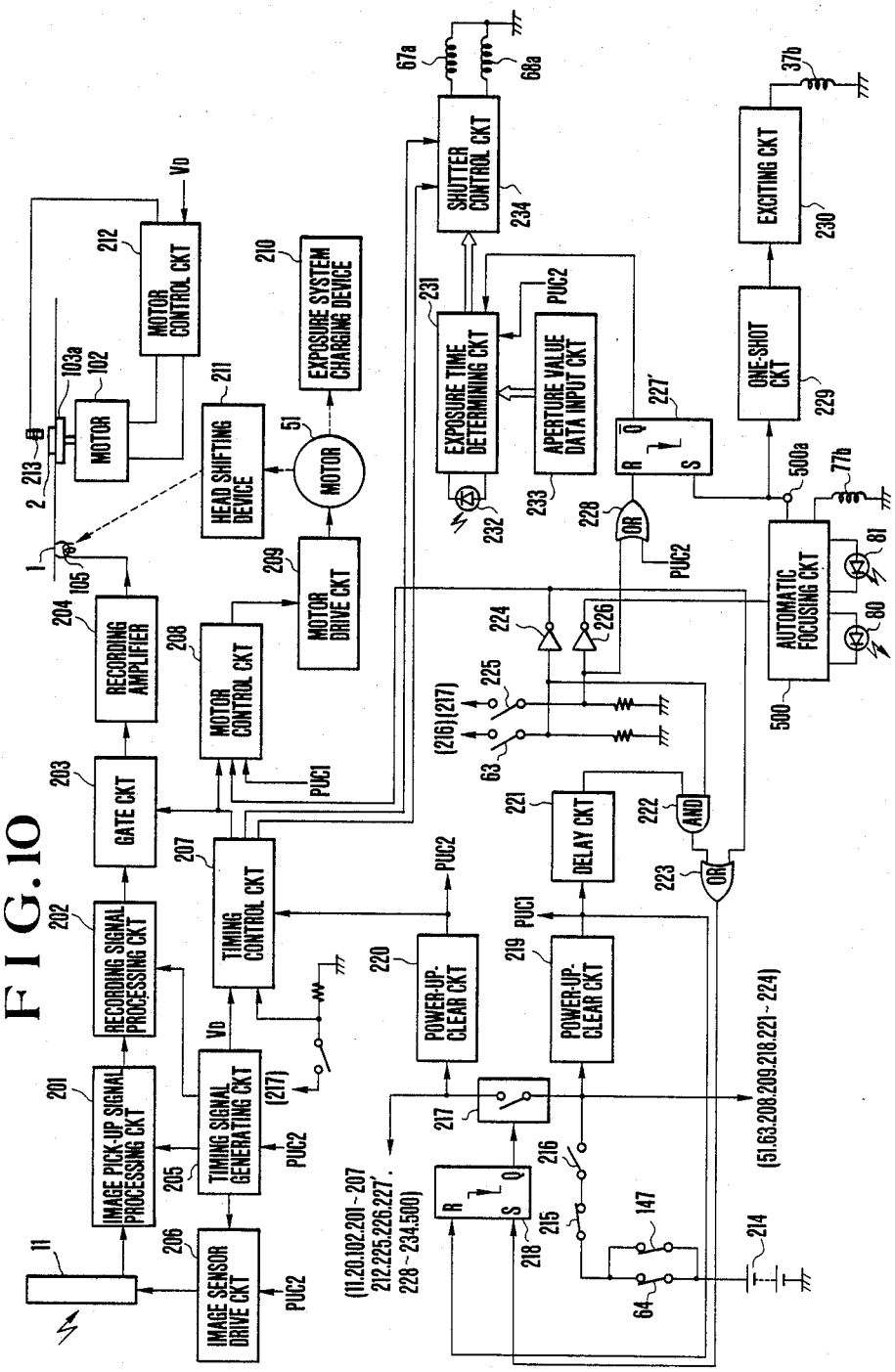
FIG. 10 is a circuit block diagram showing an electric circuit system of a camera using the automatic focusing device shown in FIG. 9.

Referring to FIG. 10, the electric circuit system of the camera, which is equipped with the automatic focusing device described above, is arranged as follows. In FIG. 10, the circuit elements indicated by the same reference numerals as those used in FIG. 5 are arranged in the same manner as those of FIG. 5 and therefore details are omitted from description here. Reference numeral 500 identifies the above-stated automatic focusing circuit. In this case, the automatic focusing circuit 500 is arranged to be triggered by the fall of the output of the inverter 226 and to drive the light emitting element 80, to supply power to the coil 77b of the electromagnet 77 and, upon detection of the peak of the output of the photo-sensitive element 81, to cut off the power to the coil 77b and stop driving the light emitting element 80. In other words, the circuit 500 is arranged in the same manner as a known active, infrared-ray projecting type automatic focusing circuit. The circuit 500 produces, from its output terminal 500a, a signal which is kept at a high level while the power to the coil 77b continues. A fall synchronizing type RS-flip-flop 227' replaces the D-flip-flop 227 shown in FIG. 5. The flip-flop 227' is arranged to be reset by the fall of the output of the OR gate 228 and is set by the fall of the signal produced from the output terminal 500a of the automatic focusing circuit 500.

The exposure time determining circuit 231 is, in this case, arranged to store the determined exposure time value in response to the low level of the Q-output of the flip-flop 227'. The one-shot circuit 229 is arranged to produce a single pulse in response to the fall of the signal produced from the output terminal 500a of the automatic focusing circuit 500. The single pulse is produced for a predetermined length of time, which is long enough to allow the attraction piece 43 of the lever 41 to be released from being attracted by the permanent magnet 37a of the electromagnet 37 of FIG. 2 with the power supplied to the coil 37b. The automatic focusing circuit 500 and the flip-flop 227' are arranged to receive power, via the switching circuit 217, from the power source battery 214. With the exception of these points, the circuit system of FIG. 10 is arranged in the same manner as the circuit system show in FIG. 5.

Figure 11:
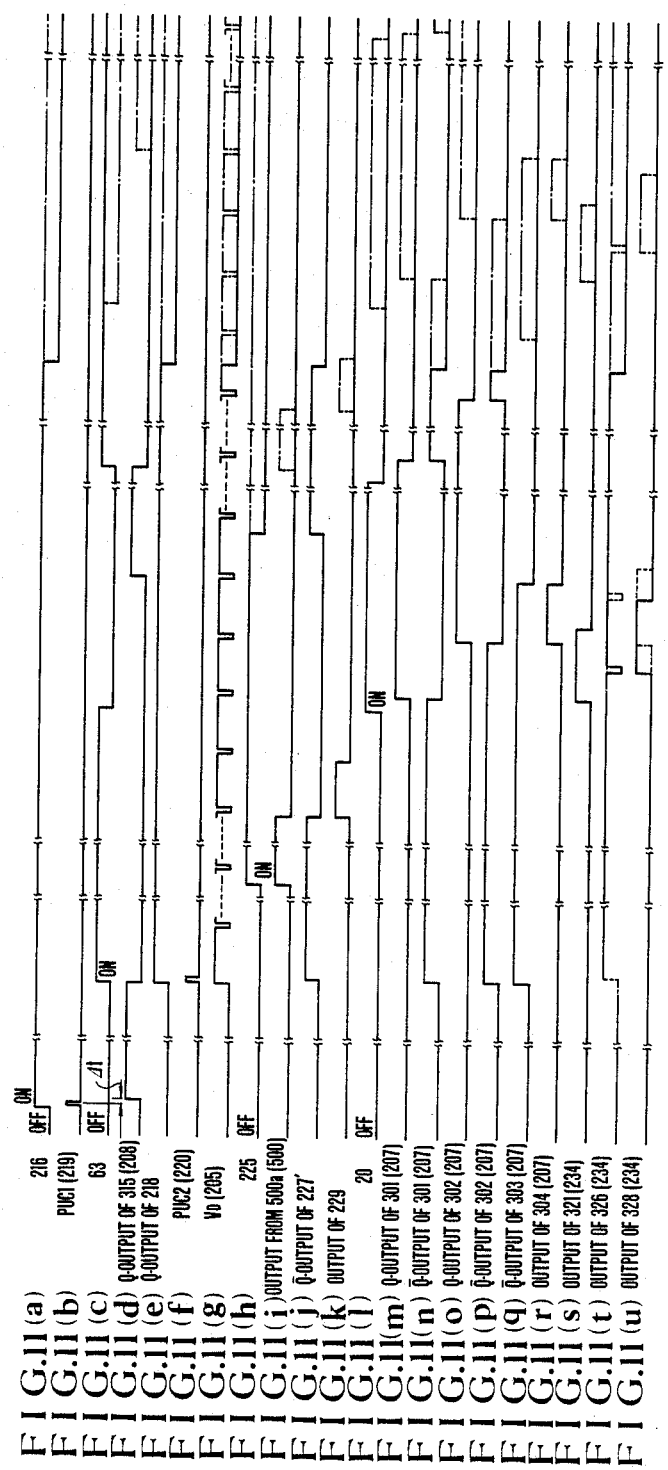
FIG. 11(a)-11(u) are to a timing chart showing the inputs and outputs of the essential circuits included in the circuit system of FIG. 10 during the operation of the circuit system.

Referring now to FIG. 11 and also to FIG. 6 which has been referred to in the foregoing, the electrical circuit system which is arranged as described above operates in the following manner. When the camera is loaded with the cassette 3, the detection switch 215 first turns on. Under this condition, when the power supply switch 216 is turned on (see FIG. 11(a)), power is supplied from the power source battery 214 to the circuit elements 51, 63, 208, 209, 215, 218, 219 and 221–224. The first power-up-clear circuit 219 then produces the power-up-clear signal PUC1 as shown in FIG. 11(b). This clear signal PUC1 resets the flip-flop 218 and the flip-flop 315 (FIG. 6), etc., of the motor control circuit 208.

At that time, the switch 63 is off if the phase of the key 126b of the counter drive shaft 126 does not coincide with that of the key slot 4c of the counter 4 of the cassette 3. In that case, therefore, the flip-flop 315 is reset by the clear signal PUC1 and is set by the output of the delay circuit 312, which is produced after the lapse of a delay time $\Delta t$ obtained by the delay circuit 312. Thus, the Q-output of the flip-flop 315 becomes high level as shown in FIG. 11(d). This causes the motor drive circuit 209 to start the charging motor 51. The head shifting device 211 then comes to shift the head 105 in the manner described in the foregoing.

The driving action of the motor 51 continues, as described in the foregoing, until the phase of the key 126b of the counter drive shaft 126 coincides with that of the key slot 4c of the counter 4 of the cassette 3 and the two engage each other. When they engage each other with their phases coinciding, the switch 63 which has been off until then turns on as shown in FIG. 11(c). The flip-flop 315 is, therefore, reset and the Q-output level thereof becomes low, as shown in FIG. 11(d). The motor 51 then comes to a stop. Furthermore, with the switch 63 turned on, the flip-flop 218 is set and the level of its Q-output becomes high, as shown in FIG. 11(e). This causes the switching circuit 217 to turn on, supplying power to the circuit elements 11, 20, 102, 201–207, 212, 220, 225, 226, 227', 228–234 and 500. Then, as shown in FIG. 11(f), the power-up-clear signal PUC2 is produced from the second power-up-clear circuit 220 to reset the circuits 205–207, 227' and 231. Therefore, the motor 102 begins to drive the disc 1. The image pick-up system then begins to operate although it is not exposed to light. The recording signal processing circuit 202 then produces and supplies a recording signal to the gate circuit 203. The timing signal generating circuit 205 produces and supplies the vertical synchronizing signal VD to the timing control circuit 207 and the motor control circuit 212 as shown in FIG. 11(g). Furthermore, at that time, the level of the $\overline{Q}$-output of the flip-flop 227' becomes high, causing the exposure time determining circuit 231 to determine an apposite length of exposure time on the basis of the output of the photometric element 232 and a preset aperture value data from the aperture value data input circuit 233 as shown in FIG. 11(j).

Referring to FIG. 11(h), when the trigger switch 225 is turned on under this condition, the automatic focusing circuit 500 is triggered as the output level of the inverter 226 changes from a high to a low level. Then, the automatic focusing operation of the picture-taking lens system is carried out in a manner as described in the foregoing. Upon completion of the focusing operation, the output level of the output terminal 500a of the automatic focusing circuit 500, which becomes high when the circuit 500 is triggered, changes to a low level as shown in FIG. 11(i). As a result, the flip-flop 227' is triggered and the level of its $\overline{Q}$-output becomes low as shown in FIG. 11(j). Accordingly, the exposure time determining circuit 231 stores or holds the exposure time value determined at that time. Meanwhile, the one-shot circuit 229 produces a single pulse as shown in FIG. 11(k). In response to this, the exciting circuit 230 supplies power to the coil 37b of the electromagnet 37. Then, as explained in the foregoing, the aperture stopping-down and mirror uplifting operations are carried out. Upon completion of the uplifting operation on the mirror 21, the switch 63 turns off as shown in FIG. 11(c) and the switch 20 turns on as shown in FIG. 11(1). With the switch 20 thus turned on, a fall of the vertical synchronizing signal VD, which takes place immediately after this, triggers the primary stage flip-flop 301 of the timing control circuit 207 (see FIG. 6) to cause the level of the Q-output thereof to change from a low to a high level and the level of its $\overline{Q}$-output from a high to a low level as shown in FIGS. 11(m) and 11(n). Then, the fall of the Q-output thus produced causes the one-shot circuit 321 of the shutter control circuit 234 (see FIG. 6) to produce a single pulse as shown in FIG. 11(s). In response to this single pulse, the exciting circuit 322 supplies power to the coil 67a of the leading shutter blade holding electromagnet 67. Therefore, as has been described in the foregoing, the leading shutter blade 13 travels to begin to expose the image sensor 11 to light. Furthermore, with the level of the $\overline{Q}$-output of the flip-flop 301 becoming low, the counter 324, which is also included in the shutter control circuit 234, is released from a reset state and begins to count the pulses produced from the oscillation circuit 323. If the exposure time, which has been determined by the exposure time determining circuit 231, is shorter than 1/60 second and the count value (A) of the counter 324 coincides with the data (B) produced from the exposure time determining circuit 231 before the lapse of 1/60 second after the flip-flop 301 is triggered, the level of the "A=B" output of the comparator 325 changes at that instant from a low to a high level. Then, as shown in FIG. 11(t), the output level of the inverter 326 changes from a high to a low level causing the output level of the AND gate 327 to change from a high to a low level. At this point of time, the level of the $\overline{Q}$-output of the flip-flop 302, which is included in the timing control circuit 207, still remains at a high level as shown in FIG. 11(p). Then, the one-shot circuit 328 produces a single pulse as shown in FIG. 11(u). In response to this single pulse, the exciting circuit 329 supplies power to the coil 68a of the trailing shutter blade holding electromagnet 68. Accordingly, as has been described in the foregoing, the trailing shutter blade 14 travels to end the exposure process on the image sensor 11.

If the exposure time determined by the exposure time determining circuit 231 is above 1/60 second, a vertical synchronizing signal VD produced after the flip-flop 301 of the primary stage of the timing control circuit 207 is triggered comes to trigger the flip-flop 302 as shown in FIGS. 11(o) and 11(p). The level of the Q-output of the flip-flop 302 then changes from a low to a high level while its $\overline{Q}$-output changes from a high to a low level. This change of the $\overline{Q}$-output from the high to the low level causes the output level of the AND gate 327 of the shutter control circuit 234 to change from a high to a low level. Therefore, as shown by a broken line in FIG. 11(u), the one-shot circuit 328 produces a single pulse. Thus, the trailing shutter blade 14 begins to travel at that instant. Therefore, the exposure time on the image sensor 11 to 1/60 second. A broken line in FIG. 11(t) shows, by way of example, the change of the output level of the inverter 326 which takes place in this case.

When the level of the Q-output of the flip-flop 302 becomes high, the output level of the AND gate 304 of the timing control circuit 207 becomes high as shown in FIG. 11(r). This high level output of the AND gate 304 turns on the gate circuit 203. With the circuit 203 thus turned on, in reading out an image pick-up signal obtained at the image sensor 11 during the above-stated exposure time, a recording signal, which is produced on the basis of the read out image pickup signal, is applied from the recording signal processing circuit 202 via the gate circuit 203 to the recording amplifier 204. As a result, the recording signal is recorded via the head 105 in one of the recording tracks on the disc 1.

Following this, another vertical synchronizing signal VD which is next produced triggers the flip-flop 303 of th timing control circuit 207. The level of the $\overline{Q}$-output of the flip-flop 303 then becomes low as shown in FIG. 11(q). The output level of the AND gate 304 also becomes low as shown in FIG. 11(r). The gate circuit 203 turns off to end the recording process.

Meanwhile, with the $\overline{Q}$-output or the flip-flop 303 changing from a high level to a low level, the flip-flop 315 of the motor control circuit 208 is set and the level of the Q-output thereof becomes high as shown in FIG. 11(d). This starts the motor 51. The head shifting device 211 shifts the head 105 to a next track position. The exposure system charging device 212 charges the exposure device. The automatic focusing device is charged. When the switch 63 turns on with the charge shaft 54 making just one turn as shown in FIG. 11(c). the flip-flop 315 is reset and the level of the Q-output thereof becomes low as shown in FIG. 11(d). This brings the motor 51 to a stop.

In the embodiment described above, a known active, infrared ray projecting type focusing device is employed as the automatic focusing device. However, the invention is not limited to the use of an automatic focusing device of that kind. Automatic focusing devices of varied kinds are usable in accordance with the invention. For example, a passive type device such as the one disclosed in Japanese Laid-Open Patent Application No. SHO 55-115023, filed by the assignee of the present application, is also usable in accordance with this invention.

Figure 9:
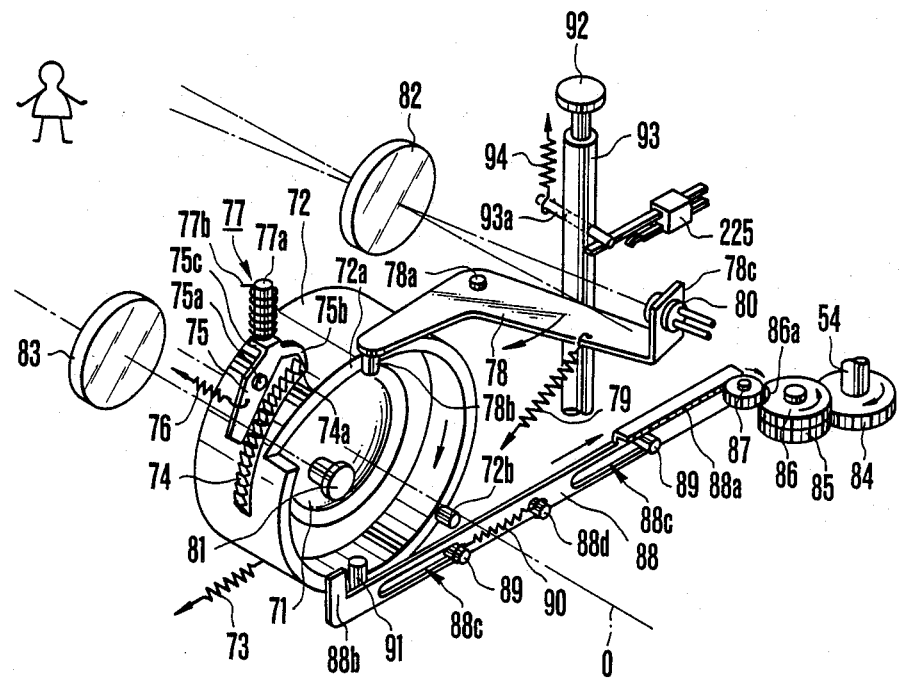
FIG. 9 is an oblique view showing, by way of example, the mechanical arrangement of an automatic focusing device employable in a further embodiment of the invention.

The embodiment shown in FIGS. 9 and 10 also can be readily arranged to permit switch-over between the single-shot modes and the successive-shot mode C in the same manner as in the preceding embodiment. In other words, the arrangement of the additional circuit 400 of FIG. 8 is also applicable to the circuit system of FIG. 10. In this case, as shown in FIG. 12, the OR gate 237 is arranged to receive at two input terminals thereof the output of the AND gate 235 and that of the inverter 226; and the output of the OR gate 237 is arranged to be applied as a trigger signal to the automatic focusing circuit 500. With the exception of these points, the additional circuit of FIG. 12 is arranged in the same manner as the circuit shown in FIG. 8. Furthermore, as in FIG. 7, the one-dot-chain lines of FIG. 11 show the inputs and outputs of the essential circuit elements obtained in the successive-shot mode C.

In the embodiments given in the foregoing and particularly in the electric circuit systems shown in FIG. 5, 8 and 10, power is supplied only to the charging motor 51 and the circuit elements related thereto if the phase of the key 126b of the counter drive shaft 126 does not coincide with the key slot 4c of the counter 4 provided on the cassette 3 with which the camera is loaded, that is, if the position of the head 105 does not coincide with a recording position indicated by the counter 4. The essential circuit elements of the camera required for exposure control, image pick-up, recording and driving the disc 1 are allowed power when the phases of the key 126b and the key slot 4c coincide with each other. Until then, a trigger operation on the camera is arranged to be impossible. This arrangement is advantageous in terms of electric energy saving and prevention of unnecessary operations particularly in a camera using a battery as the power source as in the embodiments given in the foregoing. Among the elements including the exposure control operation means 12–19, 65, 66, 231–234, 21, 24, 28, 37, 230 and 39, the image pick-up means 11, the recording means 105 and 202–204, the record bearing medium driving means 102, 212 and 213, the automatic focusing device 77, 80, 81 and 500, etc., the record bearing medium driving means consumes a great deal of electric energy. Therefore, the conservation of electric energy can also be attained to a sufficient degree by inhibiting power solely to the driving means for the record bearing medium until the head position reaches the position indicated by the counter 4. In that case, for detecting object brightness in determining the exposure time, the exposure control system may be arranged to use a luminance signal (Y signal) formed by the image pick-up signal processing circuit 201 instead of using the photometric element. Furthermore, in that case, an electronic view finder may be used in place of the optical view finder employed in the embodiments described. If the power supply is inhibited only to the exposure control operation means, useless triggering or operation of the operation means can be prevented to keep the operator from thinking that a picture-taking operation is performed or from failing to shoot due to irresponsiveness of the operation means. Furthermore, in that case, the recording bearing medium driving means is allowed to have a relatively long build up time and this permits use of an inexpensive motor which does not have to have a quick build up time as the motor 102; or the motor control circuit 212 which includes phase and speed servo arrangement can be simply and inexpensively arranged. Therefore, although all the exposure controlling operation means, image pick-up means, recording means, record bearing medium driving means and automatic focusing device are arranged to be inhibited from receiving power supply until the head position comes to coincide with the indicated position in the embodiments described, this power supply inhibiting arrangement may be applied to some of them only to attain any of the above-stated effects.

While the invention has been particularly shown and described with reference to preferred embodiments thereof, it will be understood by those skilled in the art that the foregoing and other changes in form and details can be made therein without departing from the spirit or scope of the following claims.

For example, with respect to the automatic positioning means for positioning the magnetic head 105 at the first blank part on the magnetic disc 1 housed in the cassette 3 with which the camera is loaded, the arrangement to use the counter 4 of the cassette 3 may be replaced with some other arrangement, such as the one disclosed in U.S. patent application Ser. No. 030,930 of the same assignee, abandoned, wherein the part of the magnetic disc 1 confronting the head 105 is detected as to whether or not a signal has been recorded there already each time the head is shifted, so that the head 105 can be eventually positioned at a first detected blank part of the disc. In that case, it is of course necessary to provide some reproducing circuit and some arrangement to set the reproducing circuit and the motor 102 into an operative state. Further, a static sensor, such as a magnetic resistive type element, may be used to obviate the necessity of driving the disc 1 by the motor 102 in positioning the head 105.

What is claimed is:

1. An image recording apparatus comprising:
   (a) image pick-up means for producing an image pick-up signal corresponding to an image;
   (b) actuating means for accumulating energy and for controlling the exposing state of said image pick-up means by using said accumulated energy;
   (c) recording means for recording a video signal on a record bearing medium on the basis of the image pick-up signal obtained form said image pick-up means, said recording means including a recording head which is movable relative to the record bearing medium;
   (d) a head shifting mechanism for shifting said recording head relative to said record bearing medium; and
   (e) a drive device for driving said head shifting mechanism and for causing said actuating means to accumulate energy, said drive device being common for said head shifting mechanism and said actuating means and arranged to perform the driving operation of said head shifting mechanism and the accumulating operation of said actuating means in a time sharing manner.

2. An apparatus according to claim 1, wherein said actuating means includes a shutter device which is disposed in a light receiving path of said image pick-up means.

3. An apparatus according to claim 1, wherein said actuating means includes means for operating a movable mirror device for selectively directing a light flux to be incident on said image pick-up means to view finder.

4. An apparatus according to claim 1, wherein said actuating means includes means for operating a diaphragm device disposed in a light receiving path of said image pick-up means.

5. A image recording apparatus comprising:
   (a) image pick-up means for producing an image pick-up signal corresponding to an image;
   (b) actuating means for accumulating energy and for controlling the exposing state of said image pick-up means by using said accumulated energy;
   (c) recording means for recording a video signal on a record bearing medium on the basis of the image pick-up signal obtained from said image pick-up means, said recording means including a recording head which is movable relative to said record bearing medium;
   (d) a head shifting mechanism for shifting said recording head relative to said record bearing medium;
   (e) a drive device for driving said head shifting mechanism and for causing said actuating means to accumulating energy, said drive device being common to said head shifting mechanism and said actuating means;
   (f) trigger means; and
   (g) control means having a first control mode in which said control means causes, every time the trigger means is operated, said actuating means to operate, said recording means to record said video signal and, after the recording operation, said drive device to drive the head shifting mechanism and to cause the actuating means to accumulate energy, and a second control mode in which said control means causes these operations to be repeatedly performed as long as the trigger means is operated, said control means being arranged to control said operations of said apparatus according to either of said first and second control modes.

6. An apparatus according to claim 5, wherein said actuating means includes a shutter device which is disposed in a light receiving path of said image pick-up means.

7. An apparatus according to claim 5, wherein said actuating means includes means for operating a movable mirror device for selectively directing a light flux to be incident on said image pick-up means to a view finder.

8. An apparatus according to claim 5, wherein said actuating means includes means for operating a diaphragm device which is disposed in a light receiving path of said image pick-up means.

9. An apparatus according to claim 5, wherein said drive device is arranged to perform this driving operation on said head shifting mechanism and the accumulating operation on said actuating means in a time sharing manner.

10. An image recording apparatus comprising:
   (a) image pick-up means for producing an image pick-up signal corresponding to an image;
   (b) actuating means for accumulating energy and for controlling the exposing state of said image pick-up means by using said accumulated energy;
   (c) recording means for recording a video signal on said record bearing medium on the basis of said image pick-up signal obtained from said image pick-up means, said recording means including a recording head which is movable relative to said record bearing medium;
   (d) a head shifting mechanism for shifting said recording head relative to said record bearing medium;

(e) a drive device including a drive source and for driving said head shifting mechanism and for causing said actuating means to accumulate energy, said drive device being common to said head shifting mechanism and said actuating means;
(f) detecting means for detecting that said recording head is positioned for a part of said record bearing medium which has no recorded signal; and
(g) control means for initializing said head shifting mechanism and for causing said drive device to continuously operate until said detecting means detects that said recording head is positioned for the part of the record bearing medium which has no recorded signal.

11. An image recording apparatus comprising:
(a) image pick-up means for producing an image pick-up signal corresponding to an image;
(b) actuating means for accumulating energy and for controlling the exposing state of said image pick-up means by using said accumulated energy;
(c) recording means for recording a video signal on said record bearing medium on the basis of said image pick-up signal obtained from said image pick-up means, said recording means including a recording head which is movable relative to said record bearing medium;
(d) a head shifting mechanism for shifting said recording head relative to said record bearing medium;
(e) a drive device including a drive source and for driving said head shifting mechanism and for causing said actuating means to accumulate energy, said drive device being common to said head shifting mechanism and said actuating means;
(f) lock means for locking said drive device upon completion of the driving operation on said head shifting mechanism and said accumulating operation of said actuating means;
(g) detecting means for detecting that said recording head is positioned for a part of said record bearing medium which has no recorded signal;
(h) lock inhibiting means for inhibiting means for inhibitng said lock means from locking said drive device until said detecting means detects that said recording head is positioned for the part of said record bearing medium which has no recorded signal; and
(i) initializing means for initializing said head shifting mechanism.

12. An apparatus according to claim 11, wherein said lock means is arranged to unlock said drive device in relation to the operation of said actuating means.

13. An apparatus according to claim 11, further comprising control means for causing said drive device to continuously operate until said detecting means detects that said recording head is positioned for the part of the record bearing medium which has no recorded signal.

14. An image recording apparatus comprising:
(a) image pick-up means for producing an image pick-up signal corresponding to an image;
(b) actuating means for accumulating energy and for controlling the exposing state of said image pick-up means by using said accumulated energy;
(c) recording means for recording a video signal on said record bearing medium on the basis of the image pick-up signal obtained from said image pick-up means, said recording means including a recording head which is movable relative to said record bearing medium;
(d) a head shifting mechanism for shifting said recording head relative to said record bearing medium;
(e) a signal drive device for driving said head shifting mechanism and for causing said actuating means to accumulate energy, said drive device being common to said head shifting mechanism and said actuating means;
(f) driving means for driving said record bearing medium;
(g) power supply circuit means for supplying power to at least one of said image pick-up means, said recording means and said driving means;
(h) detecting means for detecting that said record head is positioned for a part of said record bearing medium which has no recorded signal; and
(i) power supply inhibits means for inhibiting power supply from being effected at least to one of said image pick-up means, actuating means, recording means and record bearing medium driving means until said detecting means detects that said recording head is positioned for the part of said record bearing medium which has no recorded signal.

15. An apparatus according to claim 14, further comprising:
lock means for locking said drive device upon completion of the driving operation on said head shifting means and the accumulating operation of said actuating means; and
lock inhibiting means for inhibiting said lock means from locking said drive device until said detecting means detects that said recording head is positioned for the part of said record bearing medium which has no recorded signal.

16. An apparatus according to claim 15, wherein said lock means is arranged to unlock said urging device in relation to the operation of said actuating means.

17. An apparatus according to claim 14, further comprising control means causing said drive device to continuously operate until said detecting means detects that said recording head is positioned for the part of said record bearing medium which has no recorded signal.

18. An automatic focusing image recording device comprising:
(a) a focus adjustable picture-taking lens;
(b) An automatic focusing device for accumulating energy and for focusing said picture-taking lens on an object by driving the lens using accumulated energy;
(c) image pick-up means for producing an image pick-up signal corresponding to an image of the object formed by said picture-taking lens;
(d) recording means for recording a video signal on a record bearing medium on the basis of the image pick-up signal obtained from said image pick-up means, said recording means including a recording head which is movable relative to said record bearing medium;
(e) a head shifting mechanism for shifting aid recording head relative to said record bearing medium; and
(f) a common drive device for driving said head shifting mechanism and for causing said automatic focusing device to accumulate energy, said drive device driving an accumulating operation of drive energy for said head shifting mechanism and that for said automatic focusing device at different drive intervals.

19. An image recording apparatus for recording an image pick-up signal on a medium comprising:
   (a) image pick-up means for producing an image pick-up signal corresponding to an image;
   (b) means for recording said pick-up signal on a medium, said recording means including a recording head and a mechanism for moving said head on the medium; and
   (c) a common drive device for driving said moving mechanism, said common device driving said moving mechanism and an element of a mechanism for setting said apparatus in a ready state capable of photographing, at different drive intervals.

20. The apparatus according to claim 19, wherein said single drive device drives said moving mechanism and said element in a time sharing manner.

21. The apparatus according to claim 19, wherein said element includes:
   means for controlling an exposing state of said image pick-up means.

22. The apparatus according to claim 21, wherein said control means includes:
   a shutter device being disposed in a light receiving path of said image pick-up means.

23. The apparatus according to claim 21, wherein said control means includes:
   a movable mirror device for selectively directing a light flux to be incident on said image pick-up means to a viewfinder.

24. The apparatus according to claim 19, further comprising:
   lens means for forming said image on said image pick-up means and wherein said element includes a lens driving mechanism for driving said lens means.

25. The apparatus according to claim 24, wherein said lens driving mechanism is means for driving said lens means so as to bring the image formed by said lens means into an in-focus condition on said image pick-up means.

26. The apparatus according to claim 19, further comprising lock means for locking the drive of said element while the drive force of said drive device is transferred to drive said moving mechanism.

27. The apparatus according to claim 19, further comprising:
   (a) a mount mechanism for mounting said medium on a recording position of said recording means;
   (B) means for initially setting said moving mechanism in response to the mount of said medium by said mount mechanism and for setting said head on said medium in a predetermined position.

* * * * *